United States Patent
Choi et al.

(10) Patent No.: US 10,433,337 B2
(45) Date of Patent: Oct. 1, 2019

(54) METHOD FOR TRANSMITTING DATA IN WIRELESS COMMUNICATION SYSTEM AND APPARATUS THEREFOR

(71) Applicant: LG ELECTRONICS INC., Seoul (KR)

(72) Inventors: Hyeyoung Choi, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/327,013

(22) PCT Filed: Dec. 7, 2015

(86) PCT No.: PCT/KR2015/013306
§ 371 (c)(1),
(2) Date: Jan. 17, 2017

(87) PCT Pub. No.: WO2017/022898
PCT Pub. Date: Feb. 9, 2017

(65) Prior Publication Data
US 2017/0208625 A1    Jul. 20, 2017

Related U.S. Application Data

(60) Provisional application No. 62/250,508, filed on Nov. 4, 2015, provisional application No. 62/242,313, filed
(Continued)

(51) Int. Cl.
*H04W 72/02* (2009.01)
*H04W 74/08* (2009.01)
(Continued)

(52) U.S. Cl.
CPC ......... *H04W 74/0808* (2013.01); *H04L 27/26* (2013.01); *H04W 72/085* (2013.01); *H04W 74/006* (2013.01); *H04W 88/08* (2013.01)

(58) Field of Classification Search
CPC ..... H04L 1/1861; H04L 1/1896; H04L 27/26; H04W 72/1289; H04W 74/0808; H04W 74/006; H04W 72/085; H04W 88/08
See application file for complete search history.

(56) References Cited

U.S. PATENT DOCUMENTS 7,027,462 B2 * 4/2006 Benveniste ......... H04L 12/4013
                                                    370/445
8,085,683 B2 * 12/2011 Leith .................... H04W 24/10
                                                    370/252
(Continued)

FOREIGN PATENT DOCUMENTS

EP           3242527        11/2017
JP        2016532388        10/2016
(Continued)

OTHER PUBLICATIONS

PCT International Application No. PCT/KR2015/013306, International Search Report dated Apr. 28, 2016, 2 pages.
(Continued)

*Primary Examiner* — Phuc H Tran
(74) *Attorney, Agent, or Firm* — Lee, Hong, Degerman, Kang & Waimey

(57) ABSTRACT

A method for performing, by a station (STA) apparatus, uplink (UL) multi-user (MU) transmission in a wireless communication system according to an embodiment of the present invention includes performing carrier sensing on a channel, receiving a trigger frame including information for UL MU transmission and a carrier sense indicator indicating whether a result of the carrier sensing is to be reflected from an access point (AP), and transmitting an UL MU frame
(Continued)

through the channel based on the information for UL MU transmission. The UL MU frame is transmitted through the channel based on a result of the carrier sensing if the carrier sense indicator indicates the reflection of a result of the carrier sensing. The UL MU frame is transmitted through the channel regardless of a result of the carries sensing if the carrier sense indicator does not indicate the reflection of a result of the carrier sensing.

16 Claims, 19 Drawing Sheets

Related U.S. Application Data on Oct. 16, 2015, provisional application No. 62/202,175, filed on Aug. 7, 2015, provisional application No. 62/201,116, filed on Aug. 5, 2015, provisional application No. 62/199,255, filed on Jul. 31, 2015.

(51) Int. Cl.

| | | |
|---|---|---|
| *H04L 27/26* | (2006.01) | |
| *H04W 72/08* | (2009.01) | |
| *H04W 74/00* | (2009.01) | |
| *H04W 88/08* | (2009.01) | |

(56) References Cited

U.S. PATENT DOCUMENTS

| | | | |
|---|---|---|---|
| 8,363,744 B2 | 1/2013 | Agee et al. | |
| 9,198,197 B2* | 11/2015 | Kneckt | H04W 74/0816 |
| 2010/0034159 A1 | 2/2010 | Shin et al. | |
| 2015/0117365 A1 | 4/2015 | Merlin et al. | |
| 2015/0117368 A1* | 4/2015 | Barriac | H04W 72/02 |
| | | | 370/329 |
| 2015/0189531 A1 | 7/2015 | Seo et al. | |
| 2015/0195849 A1* | 7/2015 | Bashar | H04W 16/14 |
| | | | 370/330 |
| 2015/0319782 A1* | 11/2015 | Chu | H04W 74/08 |
| | | | 370/336 |
| 2016/0088602 A1* | 3/2016 | Seok | H04L 5/0055 |
| | | | 370/338 |

FOREIGN PATENT DOCUMENTS

| | | |
|---|---|---|
| JP | 2016541165 | 12/2016 |
| JP | 2018500848 | 1/2018 |
| WO | 2015023143 | 2/2015 |
| WO | 2015093792 | 6/2015 |
| WO | 2016108633 | 7/2016 |

OTHER PUBLICATIONS

Boris Bettalta "IEEE 802.11ax: High-Efficiency WLANs", IEEE Wireless Communications Magazine, Jul. 28, 2015, 16 pages.
Afaqui, et al. "Evaluation of Dynamic Sensitivity Control Algorithm for IEEE 802.11ax", Wireless Communications and Networking Conference, 6 pages.
European Patent Office Application Serial Number 15891408.5, Search Report dated Feb. 6, 2018, 10 pages.
IP Australia Application Serial Number 2015404488, Office Action dated Feb. 21, 2018, 5 pages.
Ahn, W. et al., "Multi Channel Availability for UL-OFDMA", doc.: IEEE 802.11-15/0612r0, May 2015, 16 pages.
Japan Patent Office Application No. 2017-533219, Notice of Allowance dated Jun. 26, 2018, 2 pages.
Canadian Intellectual Property Office Application Serial No. 2,946,926, Office Action dated Jul. 19, 2018, 4 pages.
Ryu, K. et al., "Indication for UL MU Carrier Sensing", doc.: IEEE 802.11-16/0057r0, Jan. 2016, 15 pages.
Ryu, K. et al., "CCA consideration for UL MU transmission", doc.: IEEE 802.11-15/1058r0, Sep. 2015, 16 pages.
Intellectual Property Office of India Application No. 201627038659, Office Action dated May 22, 2019, 6 pages.

* cited by examiner

【Fig. 1】
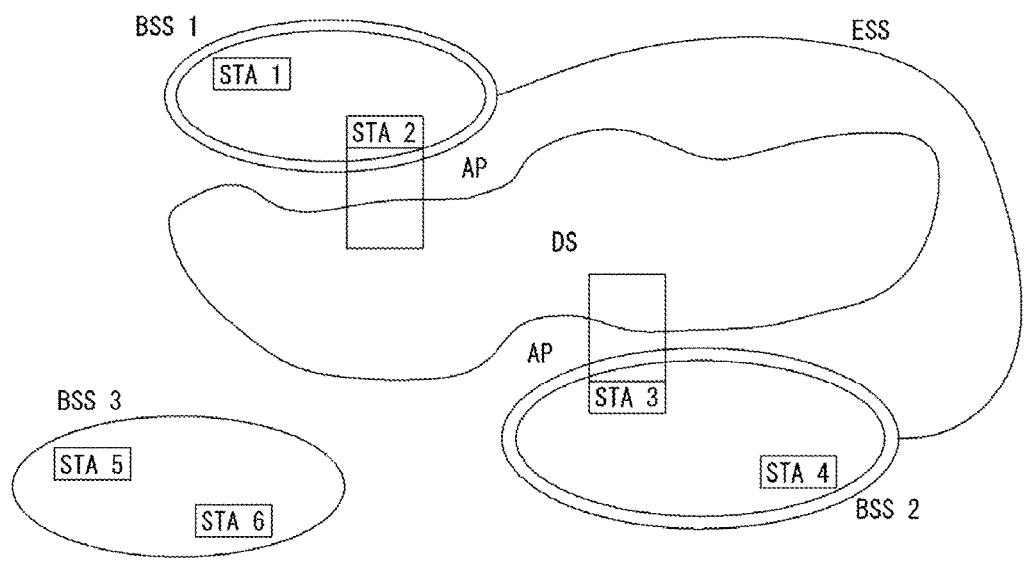

[Fig. 2]
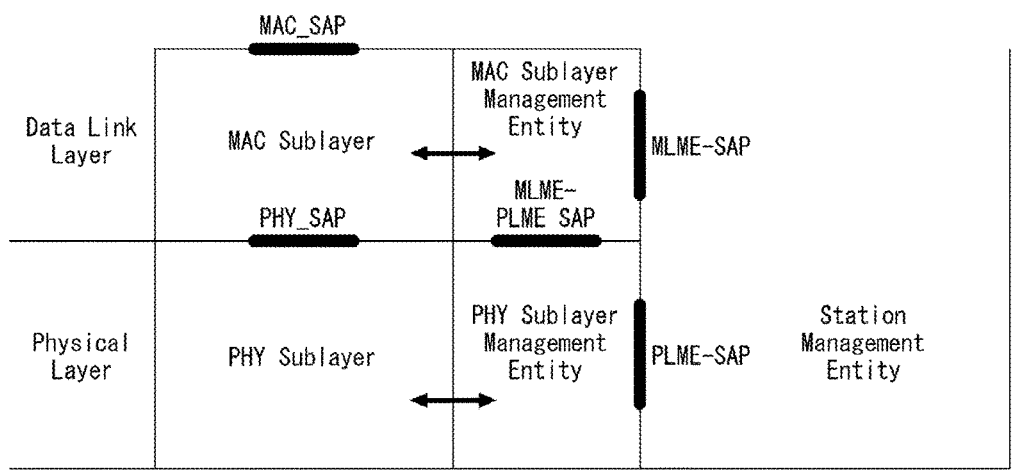

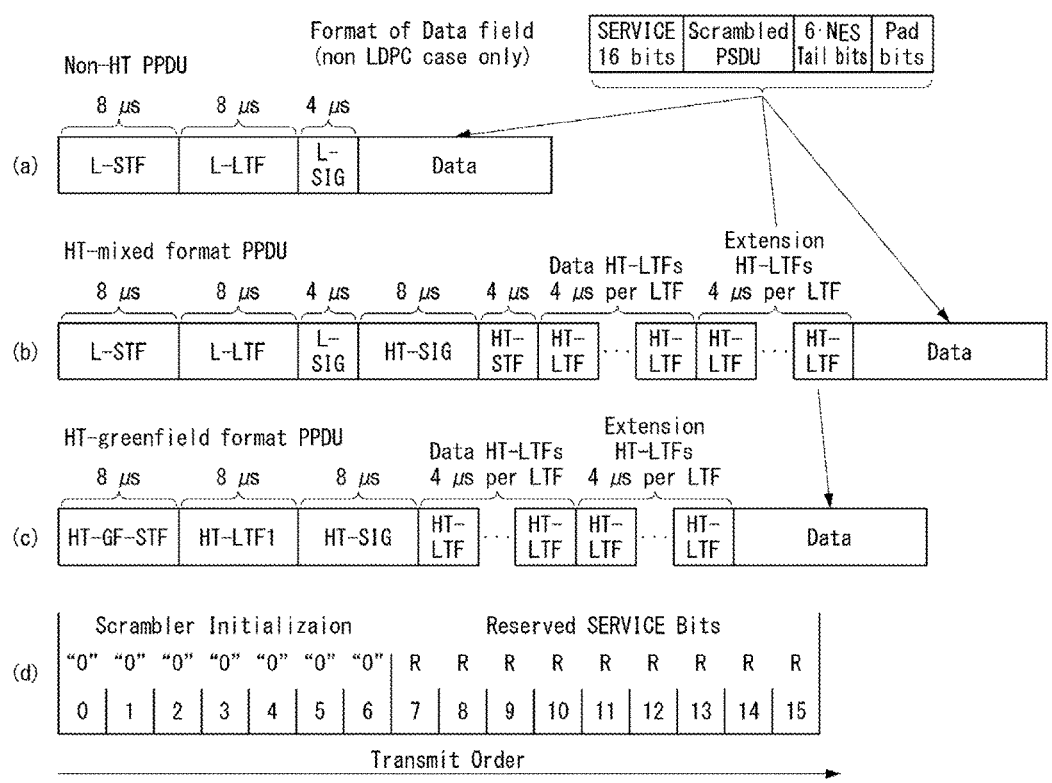
[Fig. 3]

[Fig. 4]
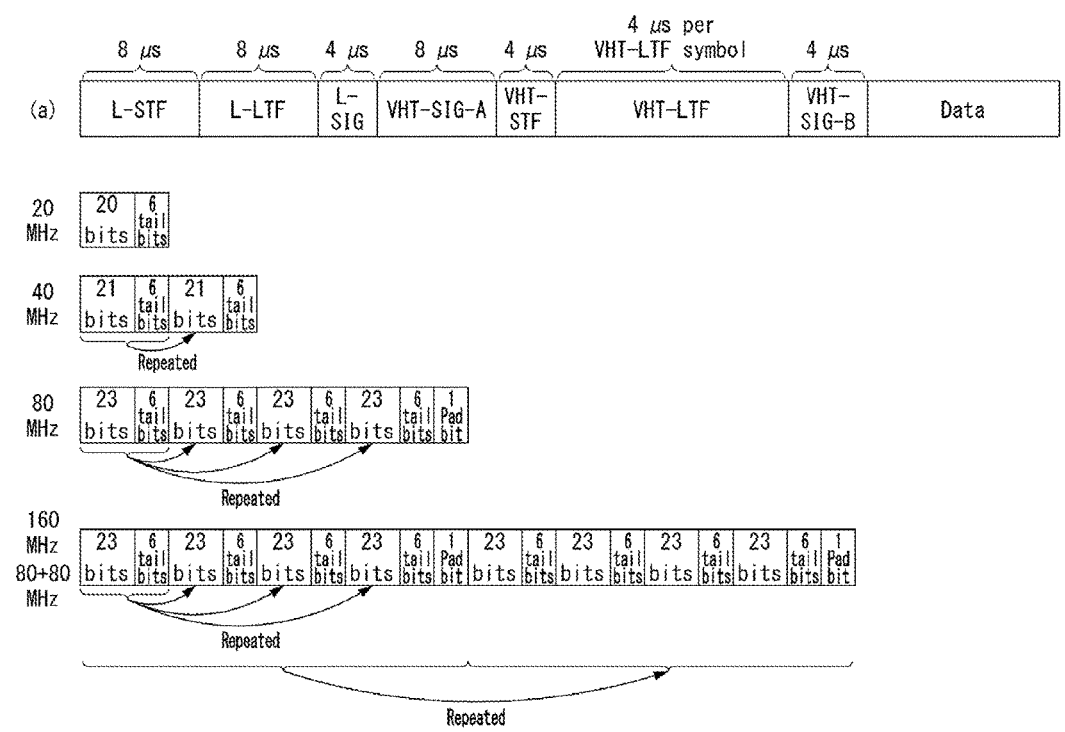

[Fig. 5]
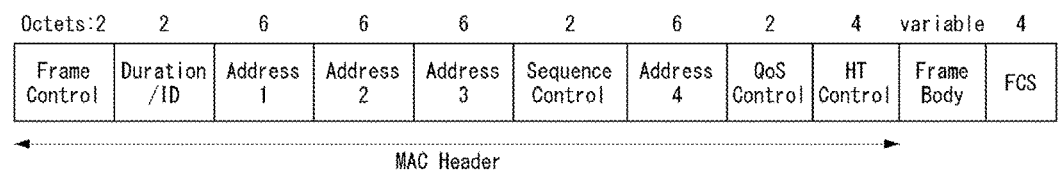

[Fig. 6]
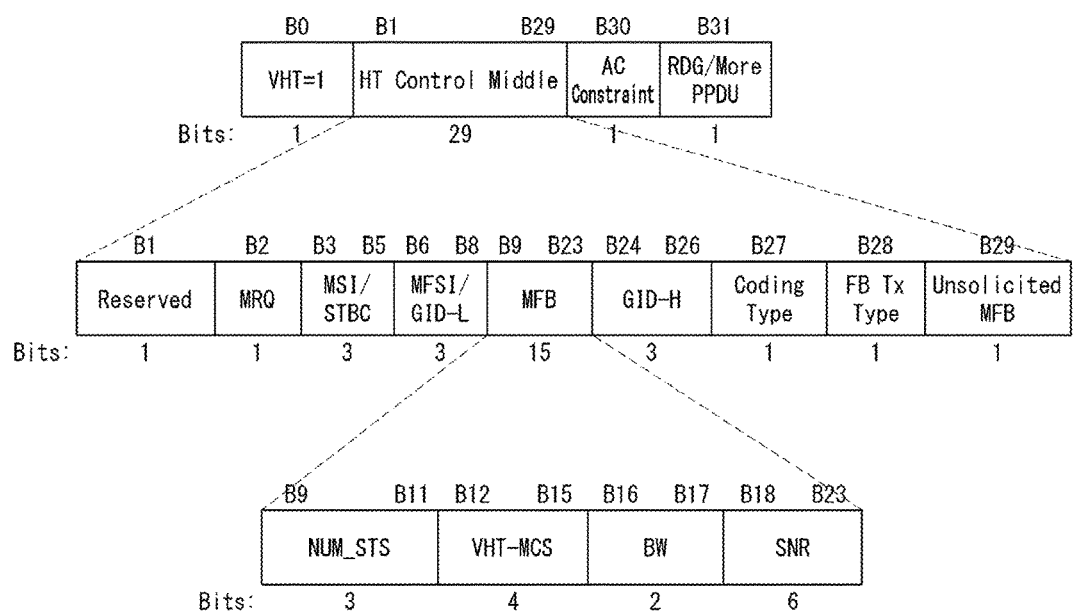

[Fig. 7]
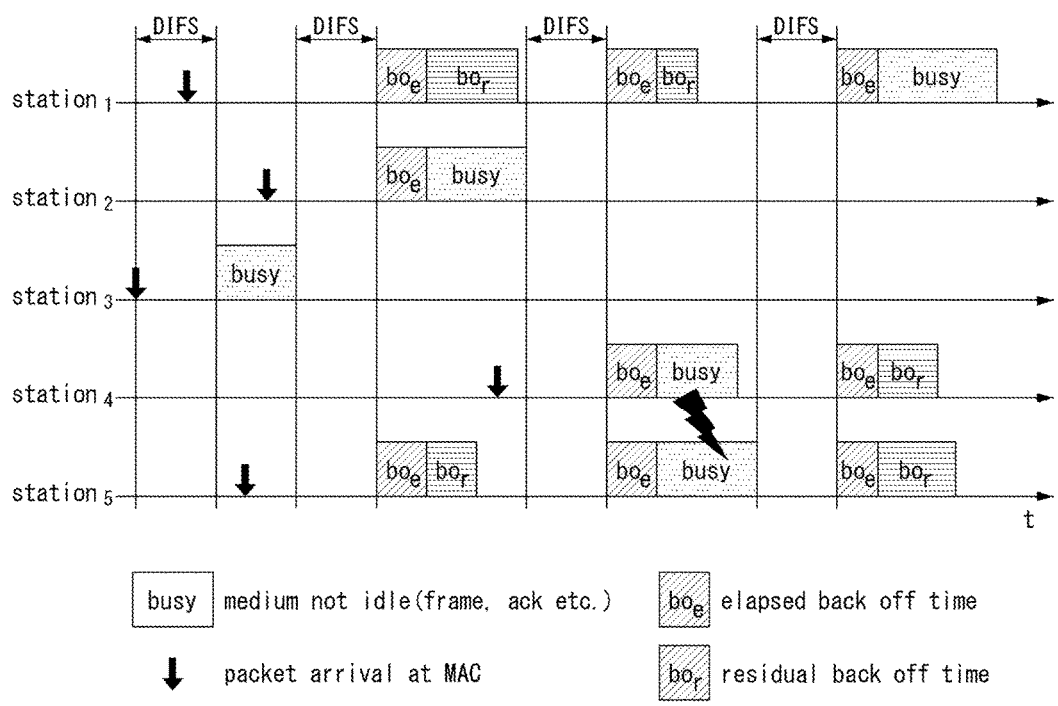

【Fig. 8】
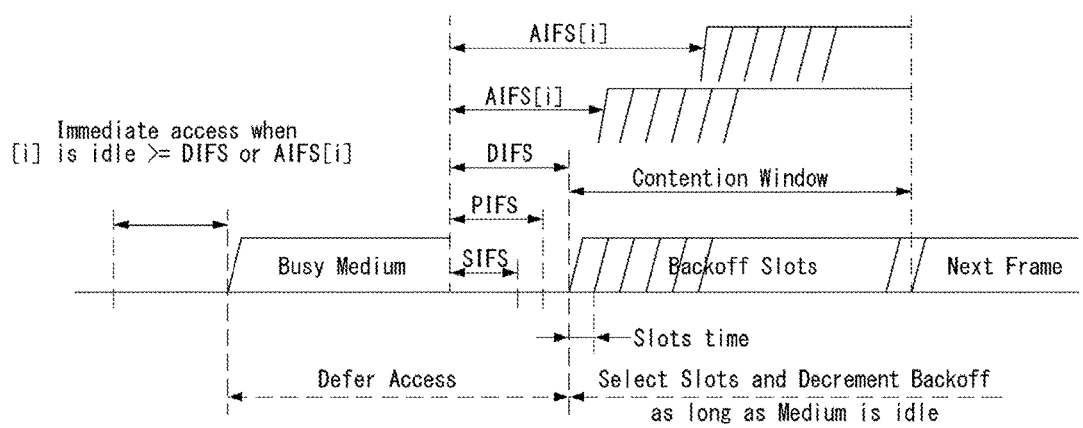

[Fig. 9]
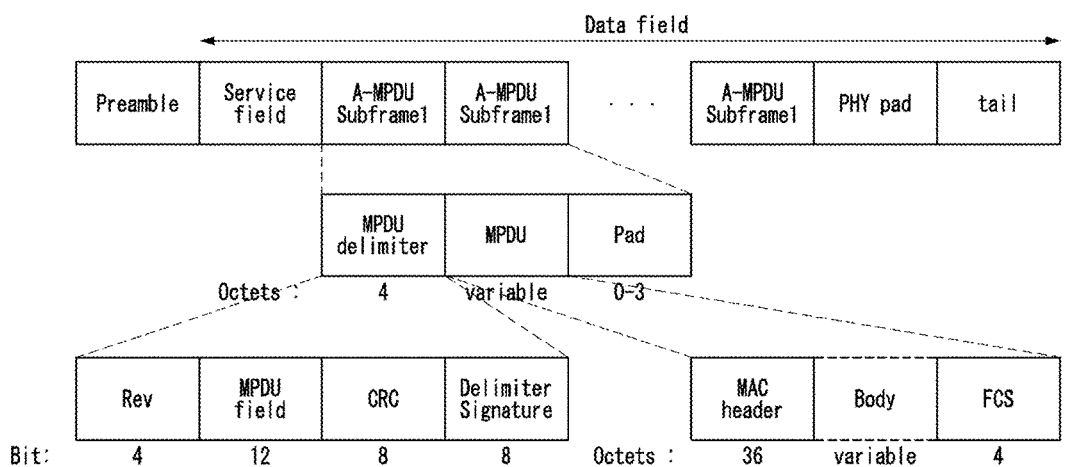

[Fig. 10]
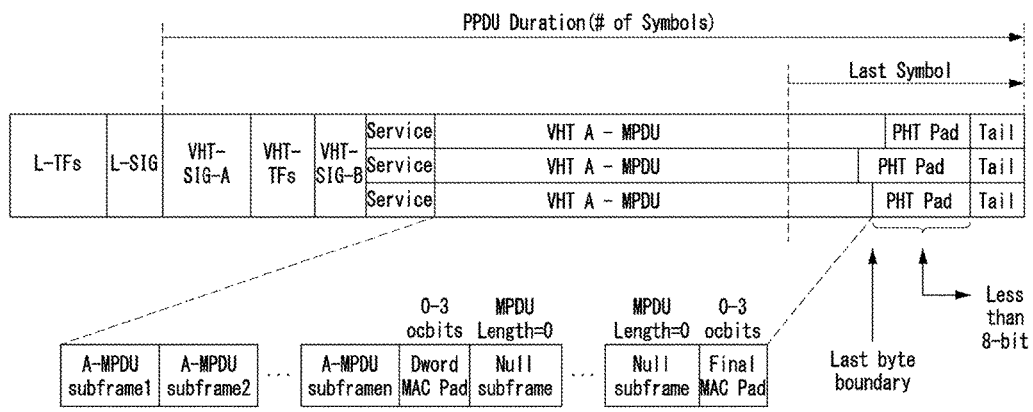
[Fig. 11]
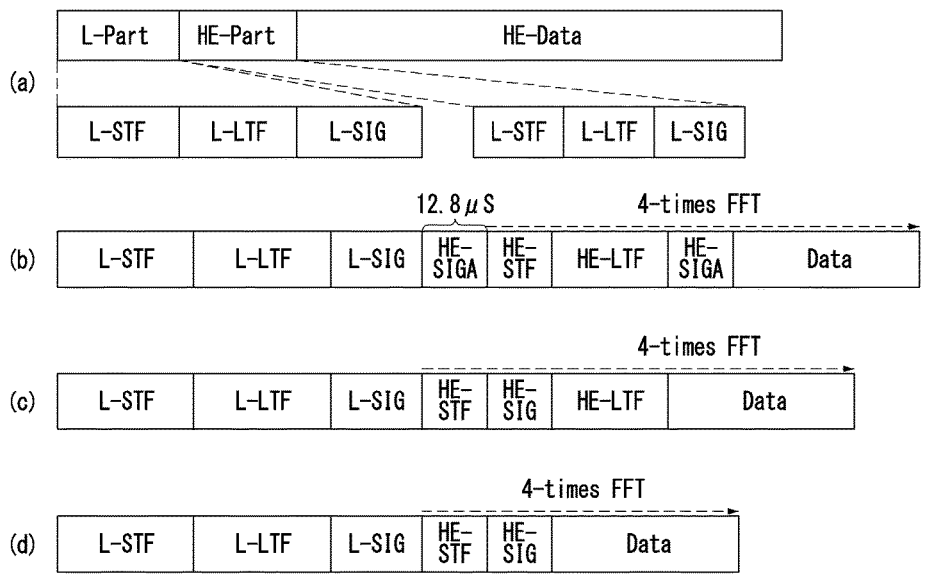

【Fig. 12】
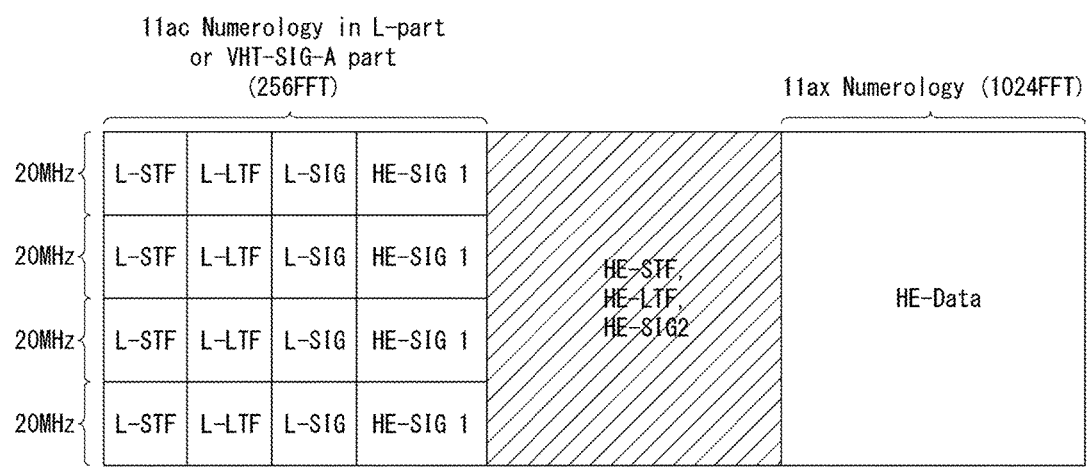

【Fig. 13】

| | | | | | | | | |
|---|---|---|---|---|---|---|---|---|
| 20MHz | L-STF | L-LTF | L-SIG | HE-SIG 1 | HE-STF | HE-LTF | HE-SIG2 | HE-Data(SU/MU) |
| 20MHz | L-STF | L-LTF | L-SIG | HE-SIG 1 | HE-STF | HE-LTF | HE-SIG2 | HE-Data(SU/MU) |
| 20MHz | L-STF | L-LTF | L-SIG | HE-SIG 1 | | | | |
| 20MHz | L-STF | L-LTF | L-SIG | HE-SIG 1 | HE-STF | HE-LTF | HE-SIG2 | HE-Data(SU/MU) |

【Fig. 14】
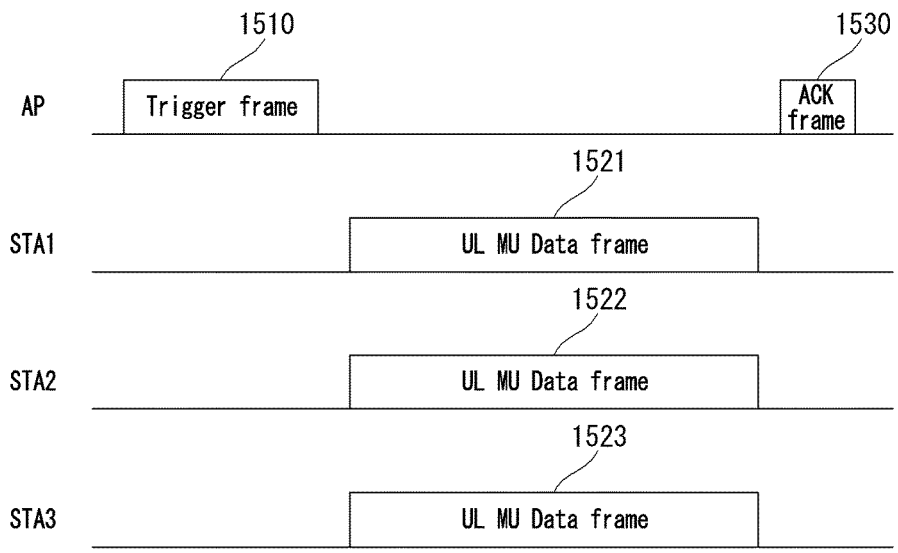
【Fig. 15】

[Fig. 16]
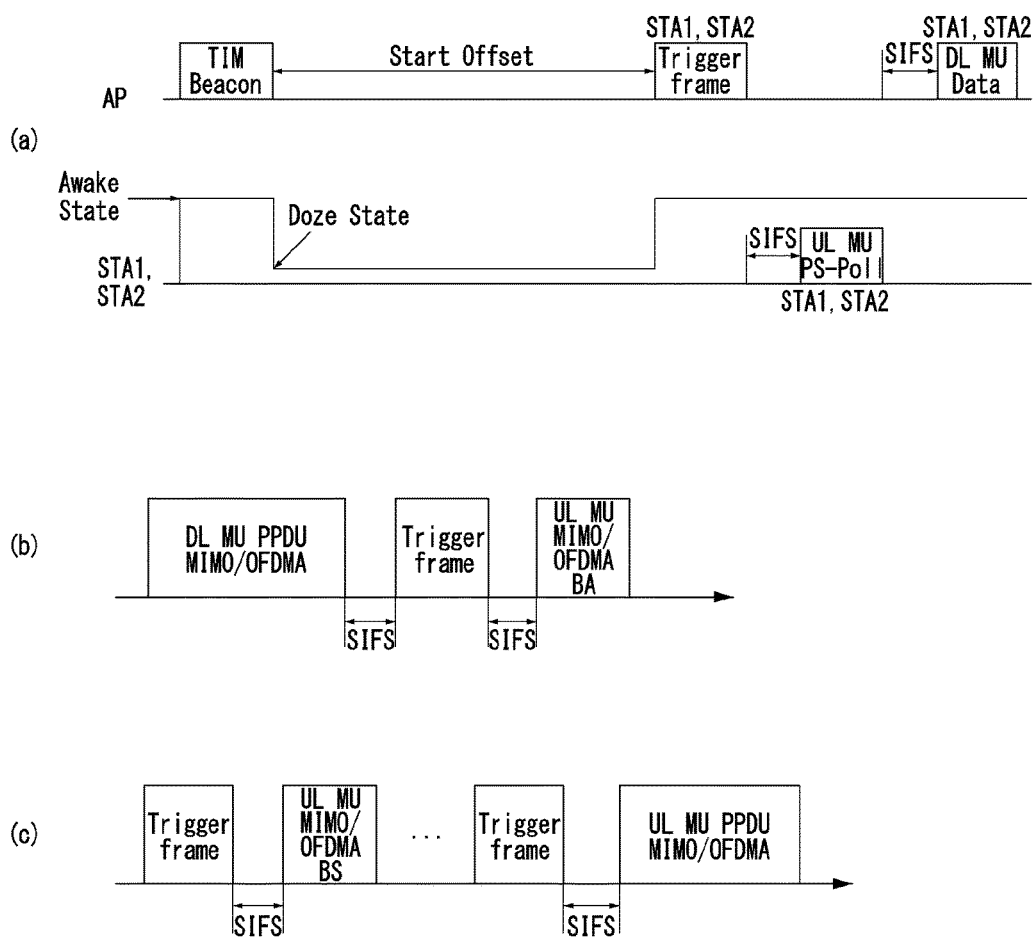

【Fig. 17】
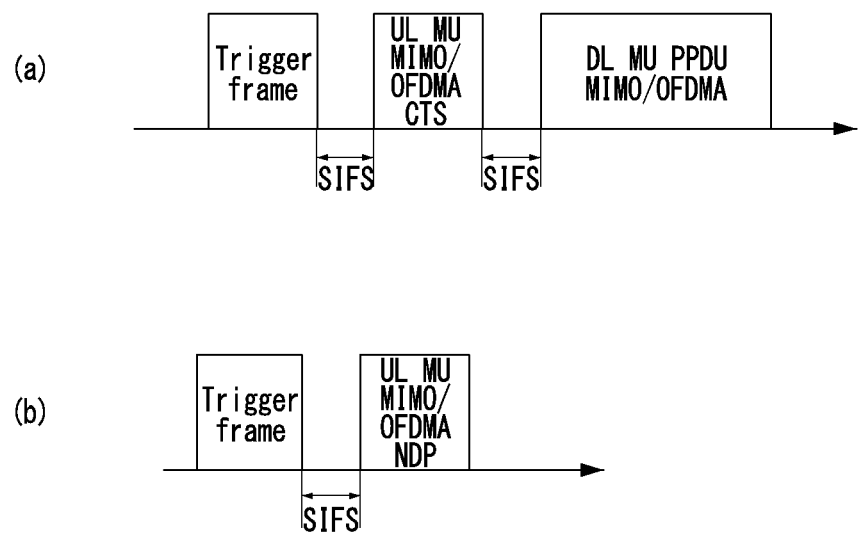

【Fig. 18】
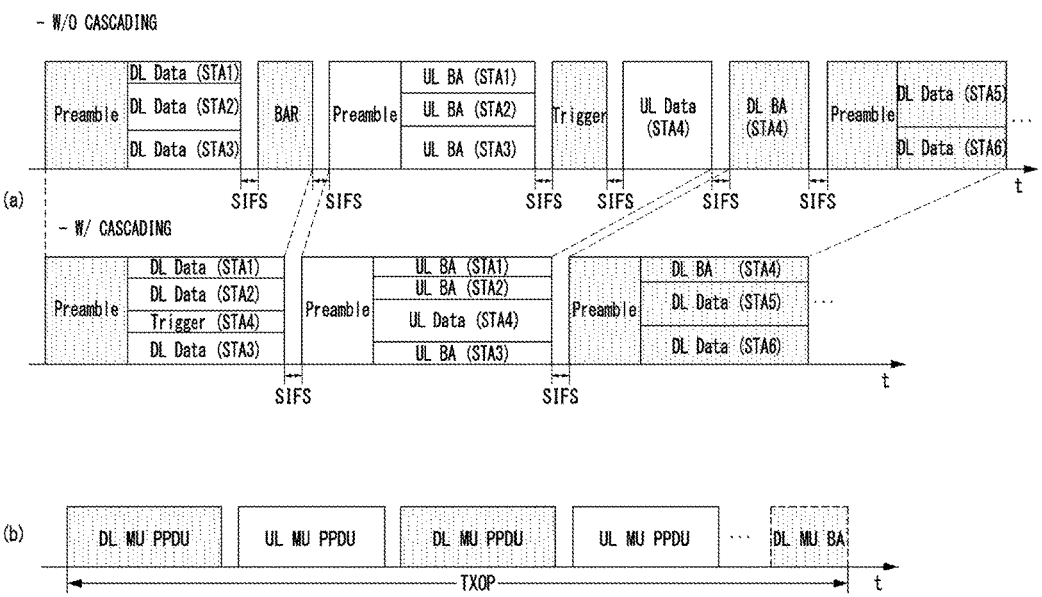
【Fig. 19】
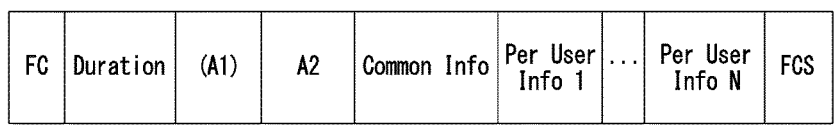
【Fig. 20】
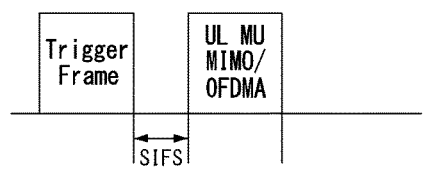

【Fig. 21】
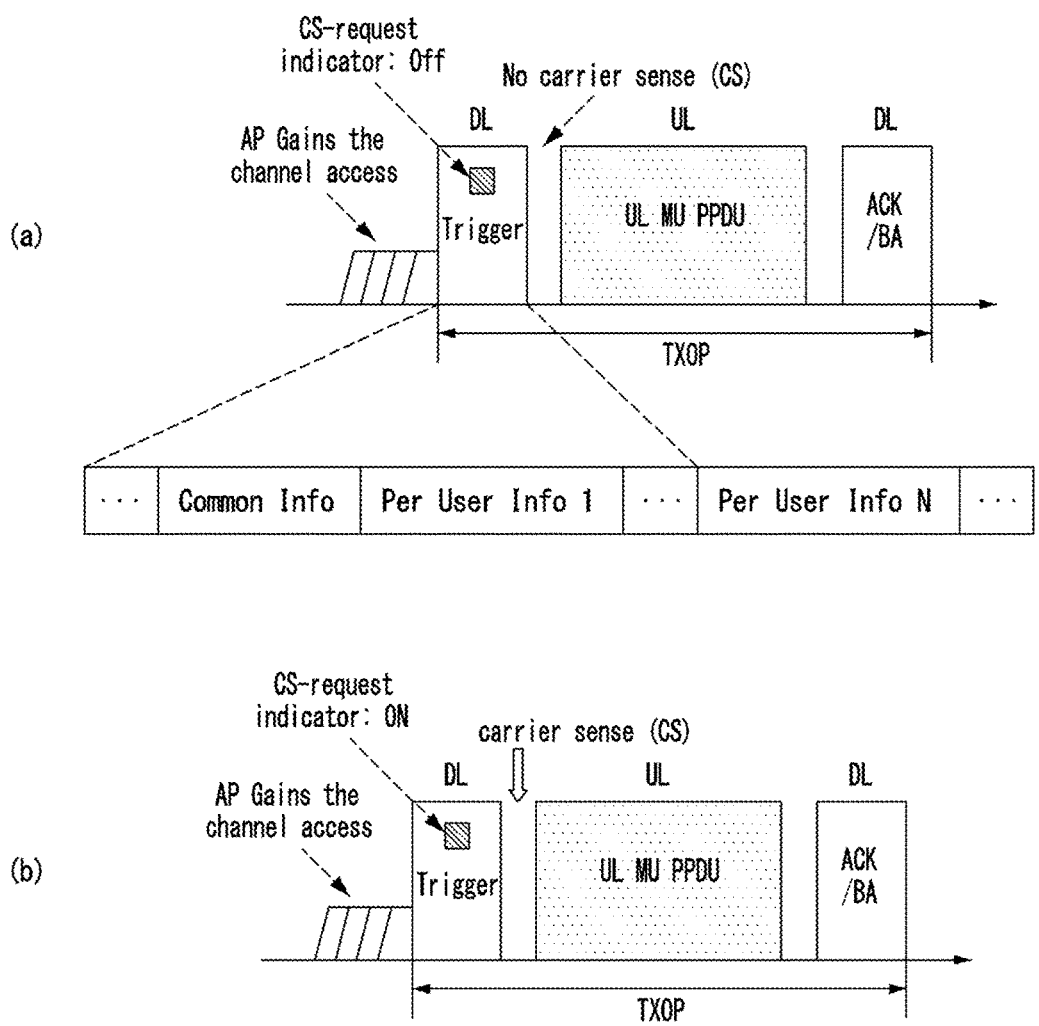

[Fig. 22]
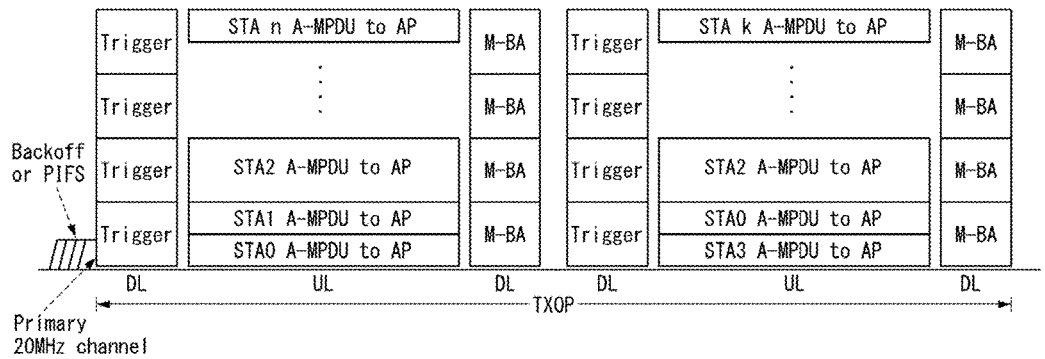
[Fig. 23]
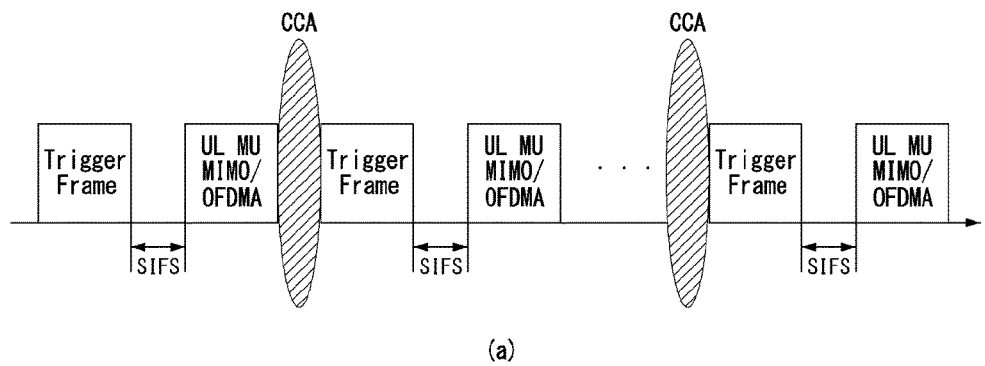
(a)
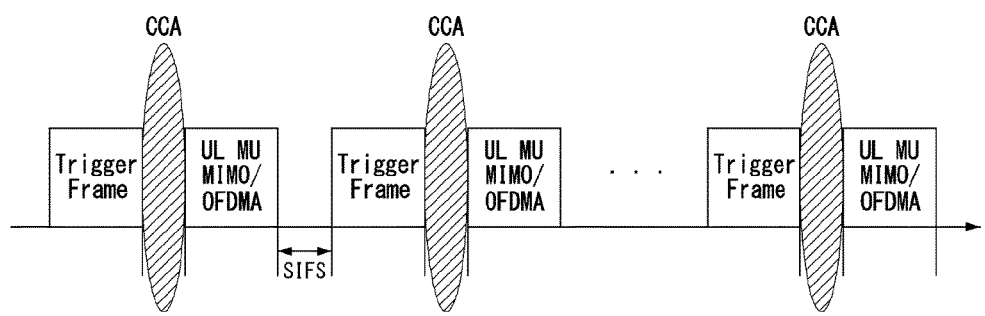
(b)

[Fig. 24]
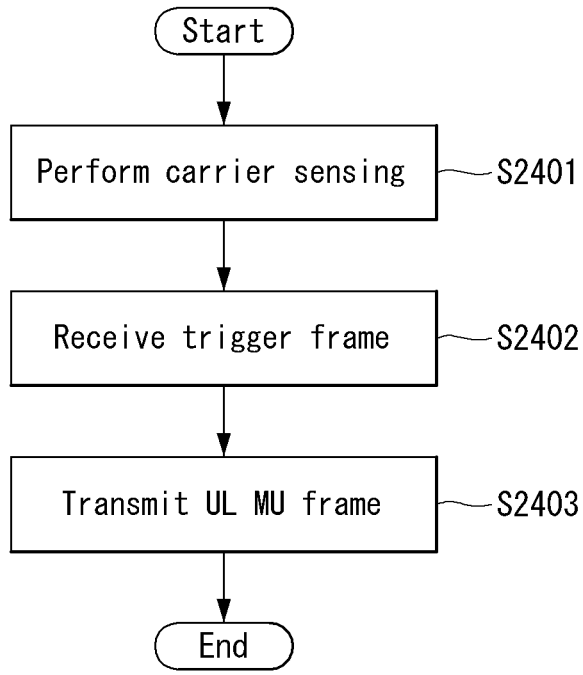
[Fig. 25]
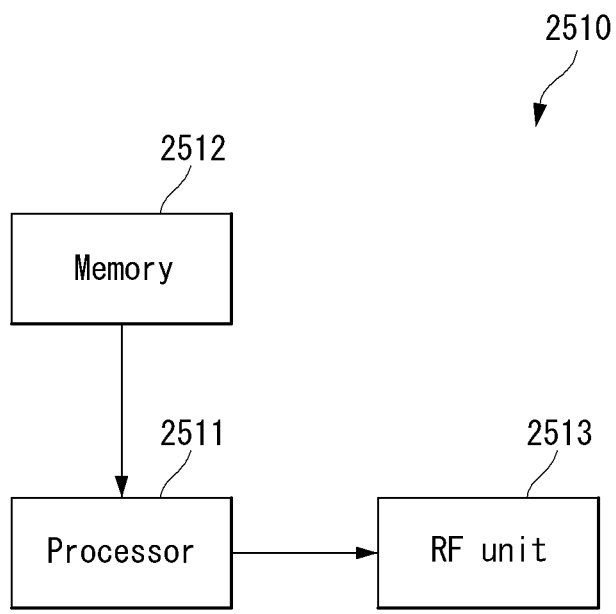

METHOD FOR TRANSMITTING DATA IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/013306, filed on Dec. 7, 2015, which claims the benefit of U.S. Provisional Application Nos. 62/199,255, filed on Jul. 31, 2015, 62/201,116, filed Aug. 5, 2015, 62/202,175, filed on Aug. 7, 2015, 62/242,313, filed Oct. 16, 2015 and 62/250,508, filed on Nov. 4, 2015, the contents of which are all hereby incorporated by reference herein in their entirety.

TECHNICAL FIELD

The present invention relates to a wireless communication system and, more particularly, to a data transmission method for supporting the transmission of data by multiple users and an apparatus supporting the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

Embodiments of the present invention are directed to the proposal of a method for transmitting and receiving uplink/downlink multi-user (UL/DL MU) data in a wireless communication system.

An embodiment of the present invention relates to a method for transmitting an UL MU frame in the next-generation WLAN system and, more particularly, to a method for transmitting an UL MU frame by a trigger frame. In an embodiment of the present invention, a trigger frame may indicate whether a result of carrier sensing for a channel in which an UL MU frame will be transmitted will be reflected or not.

Technical objects to be achieved by the present invention are not limited to the aforementioned objects, and those skilled in the art to which the present invention pertains may evidently understand other technical objects from the following description.

Technical Solution

In an embodiment of the present invention, a method for performing, by a station (STA) apparatus, uplink (UL) multi-user (MU) transmission in a wireless communication system includes performing carrier sensing on a channel, receiving a trigger frame including information for UL MU transmission and a carrier sense indicator indicating whether a result of the carrier sensing is to be reflected from an access point (AP), and transmitting an UL MU frame through the channel based on the information for UL MU transmission. The UL MU frame is transmitted through the channel based on a result of the carrier sensing if the carrier sense indicator indicates the reflection of a result of the carrier sensing. The UL MU frame is transmitted through the channel regardless of a result of the carries sensing if the carrier sense indicator does not indicate the reflection of a result of the carrier sensing.

Furthermore, if the carrier sense indicator indicates the reflection of the result of the carrier sensing, the UL MU frame may be transmitted through the channel if the channel is an idle state as a result of the carrier sensing for the channel, and the UL MU frame may not be transmitted through the channel if the channel is a busy state as a result of the carrier sensing for the channel.

Furthermore, the idle state of the channel may indicate that clear channel assessment (CCA) and a network allocation vector (NAV) are the idle state as a result of the carrier sensing. The busy state of the channel may indicate that at least one of a result of the carrier sensing, the CCA, and the NAV is the busy state.

Furthermore, if the carrier sense indicator does not indicate the reflection of a result of the carrier sensing, the UL MU frame may be transmitted after a predetermined time since the trigger frame is received.

Furthermore, the predetermined time may include a short interframe space (SIFS).

Furthermore, the carrier sense indicator may be included in the common information field or user-specific information field of the trigger frame.

Furthermore, performing the carrier sensing on the channel may include performing the carrier sensing on the channel during a PCF interframe space (PIFS) before the trigger frame is received.

Furthermore, a station (STA) apparatus performing uplink (UL) multi-user (MU) transmission in a wireless communication system according to an embodiment of the present invention includes a radio frequency (RF) unit configured to transmit/receive radio signals and a processor configured to control the RF unit. The processor is configured to perform carrier sensing on a channel, receive a trigger frame including information for UL MU transmission and a carrier sense indicator indicating whether a result of the carrier sensing is to be reflected from an access point (AP), and transmit an UL MU frame through the channel based on the information for UL MU transmission. The UL MU frame is transmitted through the channel based on a result of the carrier sensing if the carrier sense indicator indicates the reflection of a result of the carrier sensing. The UL MU frame is transmitted through the channel regardless of a result of the carries sensing if the carrier sense indicator does not indicate the reflection of a result of the carrier sensing.

Furthermore, if the carrier sense indicator indicates the reflection of the result of the carrier sensing, the processor may be configured to transmit the UL MU frame through the channel if the channel is an idle state as a result of the carrier sensing for the channel and to not transmit the UL MU frame through the channel if the channel is a busy state as a result of the carrier sensing for the channel.

Furthermore, the idle state of the channel may indicate that clear channel assessment (CCA) and a network allocation vector (NAV) are the idle state as a result of the carrier sensing. The busy state of the channel may indicate that at least one of a result of the carrier sensing, the CCA, and the NAV is the busy state.

Furthermore, if the carrier sense indicator does not indicate the reflection of a result of the carrier sensing, the processor may be configured to transmit the UL MU frame after a predetermined time since the trigger frame is received.

Furthermore, the predetermined time may include a short interframe space (SIFS).

Furthermore, the carrier sense indicator is included in a common information field or user-specific information field of the trigger frame.

Furthermore, wherein the processor may be configured to perform the carrier sensing on the channel during a PCF interframe space (PIFS) before the trigger frame is received.

Advantageous Effects

In accordance with an embodiment of the present invention, there is an advantage in that a load of an STA can be reduced because a result of carrier sensing do not need to be reflected in order to send an UL MU frame.

Furthermore, according to an embodiment of the present invention, there is an advantage in that an UL MU frame can be transmitted more efficiently according to a characteristic of a received trigger frame because whether or not to reflect a result of carrier sensing is determined based on the format of the trigger frame.

Furthermore, according to an embodiment of the present invention, there is an advantage in that an UL MU frame can be transmitted more efficiently according to a characteristic of an UL MU PPDU because whether or not to reflect a result of carrier sensing is determined based on the length of the UL MU PPDU to be transmitted by an STA.

In addition, other advantages of the present invention are additionally described in the following embodiments.

DESCRIPTION OF DRAWINGS

FIG. 1 is a diagram showing an example of an IEEE 802.11 system to which an embodiment of the present invention may be applied.

FIG. 2 is a diagram illustrating the configuration of layer architecture of an IEEE 802.11 system to which an embodiment of the present invention may be applied.

FIG. 3 illustrating a non-HT format PPDU and an HT format PPDU in a wireless communication system to which an embodiment of the present invention may be applied.

FIG. 4 illustrates a VHT format PPDU in a wireless communication system to which an embodiment of the present invention may be applied.

FIG. 5 illustrates the format of an MAC frame for an IEEE 802.11 system to which an embodiment of the present invention may be applied.

FIG. 6 illustrates the VHT format of an HT control field in a wireless communication system to which an embodiment of the present invention may be applied.

FIG. 7 is a diagram illustrating a random backoff period and a frame transmission procedure in a wireless communication system to which an embodiment of the present invention may be applied.

FIG. 8 is a diagram illustrating an IFS relation in a wireless communication system to which an embodiment of the present invention may be applied.

FIG. 9 is a diagram illustrating a DL multi-user (MU) PPDU format in a wireless communication system to which an embodiment of the present invention may be applied.

FIG. 10 is a diagram illustrating a DL multi-user (MU) PPDU format in a wireless communication system to which an embodiment of the present invention may be applied.

FIG. 11 is a diagram illustrating a high efficiency (HE) format PPDU according to an embodiment of the present invention.

FIG. 12 is a diagram illustrating an HE PPDU format according to an embodiment of the present invention.

FIG. 13 is a diagram illustrating an HE PPDU format according to an embodiment of the present invention.

FIG. 14 is a diagram illustrating an HE PPDU format according to an embodiment of the present invention.

FIG. 15 is a diagram illustrating an UL multi-user (MU) transmission procedure according to an embodiment of the present invention.

FIG. 16 is a diagram showing embodiments regarding an UL/DL MU transmission operation between an AP and STAs.

FIG. 17 is a diagram showing embodiments regarding an UL/DL MU transmission operation between an AP and STAs.

FIG. 18 is a diagram illustrating a multi-user (MU) transmission procedure according to an embodiment of the present invention.

FIG. 19 is a diagram showing the format of a trigger frame according to an embodiment of the present invention.

FIG. 20 is a diagram illustrating a DL/UL MU transmission method according to a fourth embodiment of the present invention.

FIG. 21 is a diagram illustrating an UL MU transmission method according to an eleventh embodiment of the present invention.

FIG. 22 is a diagram illustrating an UL MU transmission method for not redundantly performing carrier sensing.

FIG. 23 is a diagram regarding a method for performing CCA according to an embodiment of the present invention.

FIG. 24 is a flowchart illustrating a data transmission method of an STA according to an embodiment of the present invention.

FIG. 25 is a block diagram of each STA apparatus according to an embodiment of the present invention.

MODE FOR INVENTION

Terms used in the present invention are common terms now widely used by taking into consideration functions in the present invention, but the terms may be changed depending on intentions of those skilled in the art, a use practice, or the appearance of a new technology. Furthermore, in a specific case, some terms are randomly selected by the applicant. In this case, the detailed meaning of a corresponding term will be described in the corresponding part of the description of the present invention. Accordingly, the terms used in the present invention should not be interpreted simply based on their names, but should be interpreted based on their substantial meanings and contents over this specification.

Furthermore, although embodiments of the present invention are described in detail with reference to the accompanying drawings and contents described in the drawings, the present invention is not limited or restricted by the embodiments.

Hereinafter, embodiments of the present invention are described in more detail with reference to the accompanying drawings.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). $3^{rd}$ generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the configuration of layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters.

The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrating a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU is configured to include a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate field of four bits, a reserved field of 1 bit, a length field of 12 bits, a parity bit of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, L-SIG, and HT-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

Table 1 below illustrates the HT-SIG field.

TABLE 1

| FIELD | BIT | DESCRIPTION |
| --- | --- | --- |
| MCS | 7 | Indicate a modulation and coding scheme |
| CBW 20/40 | 1 | Set to "0" if a CBW is 20 MHz or 40 MHz or upper/lower<br>Set to "1" if a CBW is 40 MHz |
| HT length | 16 | Indicate the number of data octets within a PSDU |
| Smoothing | 1 | Set to "1" if channel smoothing is recommended<br>Set to "0" if channel estimation is recommended unsmoothingly for each carrier |
| Not-sounding | 1 | Set to "0" if a PPDU is a sounding PPDU<br>Set to "1" if a PPDU is not a sounding PPDU |
| Reserved | 1 | Set to "1" |
| Aggregation | 1 | Set to "1" if a PPDU includes an A-MPDU<br>Set to "0" if not |
| Space-time block coding (STBC) | 2 | Indicate a difference between the number of space-time streams (NSTS) and the number of spatial streams (NSS) indicated by an MCS<br>Set to "00" if an STBC is not used |
| FEC coding | 1 | Set to "1" if low-density parity check (LDPC) is used<br>Set to "0" if binary convolutional code (BCC) is used |
| Short GI | 1 | Set to "1" if a short guard interval (GI) is used after HT training<br>Set to "0" if not |
| Number of extension spatial streams | 2 | Indicate the number of extension spatial streams (NESSs)<br>Set to "0" if there is no NESS<br>Set to "1" if the number of NESSs is 1<br>Set to "2" if the number of NESSs is 2<br>Set to "3" if the number of NESSs is 3 |
| CRC | 8 | Include CRS for detecting an error of a PPDU on the receiver side |
| Tail bits | 6 | Used to terminate the trellis of a convolutional decoder<br>Set to "0" |

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

Table 2 illustrates the VHT-SIG-A1 field.

TABLE 2

| FIELD | BIT | DESCRIPTION |
|---|---|---|
| BW | 2 | Set to "0" if a BW is 20 MHz<br>Set to "1" if a BW is 40 MHz<br>Set to "2" if a BW is 80 MHz<br>Set to "3" if a BW is 160 MHz or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT SU PPDU, but indicates a VHT MU PPDU if not |
| NSTS/Partial AID | 12 | In the case of a VHT MU PPDU, divide into 4 user positions<br>"p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU, Upper 3 bits are set as follows:<br>"0" if a space-time stream is 1<br>"1" if a space-time stream is 2<br>"2" if a space-time stream is 3<br>"3" if a space-time stream is 4<br>"4" if a space-time stream is 5<br>"5" if a space-time stream is 6<br>"6" if a space-time stream is 7<br>"7" if a space-time stream is 8<br>Lower 9 bits indicate a partial AID. |
| TXOP_PS_NOT_ALLOWED | 1 | Set to "0" if a VHT AP permits a non-AP VHT STA to switch to power save mode during transmission opportunity (TXOP)<br>Set to "1" if not<br>In the case of a VHT PPDU transmitted by a non-AP VHT STA<br>Set to "1" |
| Reserved | 1 | |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

TABLE 3

| FIELD | BIT | DESCRIPTION |
|---|---|---|
| Short GI | 1 | Set to "0" if a short GI is not used in a data field<br>Set to "1" if a short GI is used in a data field |
| Short GI disambiguation | 1 | Set to "1" if a short GI is used and an extra symbol is required for the payload of a PPDU<br>Set to "0" if an extra symbol is not required |
| SU/MU coding | 1 | In the case of a VHT SU PPDU:<br>Set to "0" in the case of binary convolutional code (BCC)<br>Set to "1" in the case of low-density parity check (LDPC) |

TABLE 3-continued

| FIELD | BIT | DESCRIPTION |
|---|---|---|
| | | In the case of a VHT MU PPDU:<br>Indicate coding used if the NSTS field of a user whose user position is "0" is not "0"<br>Set to "0" in the case of BCC<br>Set to "1" in the case of PDPC<br>Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU)<br>Set to "0" if not |
| SU VHT MCS/MU coding | 4 | In the case of a VHT SU PPDU:<br>Indicate a VHT-MCS index<br>In the case of a VHT MU PPDU:<br>Indicate coding for user positions "1" to "3" sequentially from upper bits<br>Indicate coding used if the NSTS field of each user is not "1"<br>Set to "0" in the case of BCC<br>Set to "1" in the case of LDPC<br>Set to "1" as a reserved field if the NSTS field of each user is "0" |
| Beamformed | 1 | In the case of a VHT SU PPDU:<br>Set to "1" if a beamforming steering matrix is applied to SU transmission<br>Set to "0" if not<br>In the case of a VHT MU PPDU:<br>Set to "1" as a reserved field |
| Reserved | 1 | |
| CRC | 8 | Include CRS for detecting an error of a PPDU on the receiver side |
| Tail | 6 | Used to terminate the trellis of a convolutional decoder<br>Set to "0" |

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

MAC Frame Format

FIG. 5 illustrates the format of an MAC frame for an IEEE 802.11 system to which an embodiment of the present invention may be applied.

Referring to FIG. 5, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field includes information about the characteristics of a corresponding MAC frame.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 6 illustrates the VHT format of an HT control field in a wireless communication system to which an embodiment of the present invention may be applied.

Referring to FIG. 6, the HT control field may include a VHT subfield, an HT control middle subfield, an AC constraint subfield, and a reverse direction grant (RDG)/more PPDU subfield.

The VHT subfield indicates whether the HT control field has the format of an HT control field for VHT (VHT=1) or has the format of an HT control field for HT (VHT=0). In FIG. 8, it is assumed that the HT control field is an HT control field for VHT (i.e., VHT=1). The HT control field for VHT may be called a VHT control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set as "1" if an RDG is present, and the RDG/more PPDU subfield is set as "0" if an RDG is not present. Assuming that a corresponding field is transmitted by an RD responder, the RDG/more PPDU subfield is set as "1" if a PPDU including the corresponding subfield is the last frame transmitted by the RD responder, and the RDG/more PPDU subfield is set as "0" if another PPDU is transmitted.

As described above, the HT control middle subfield may be implemented to a different format depending on the indication of a VHT subfield.

The HT control middle subfield of an HT control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Table 4 illustrates a description of each subfield included in the HT control middle subfield of the VHT format.

TABLE 4

| SUBFIELD | MEANING | DEFINITION |
|---|---|---|
| MRQ | MCS request | Set to "1" if MCS feedback (solicited MFB) is not requested<br>Set to "0" if not |
| MSI | MRQ sequence identifier | An MSI subfield includes a sequence number within a range of 0 to 6 to identify a specific request if an unsolicited MFB subfield is set to "0" and an MRQ subfield is set to "1."<br>Include a compressed MSI subfield (2 bits) and an STBC indication subfield (1 bit) if an unsolicited MFB subfield is "1." |

TABLE 4-continued

| SUBFIELD | MEANING | DEFINITION |
|---|---|---|
| MFSI/GID-L | MFB sequence identifier/LSB of group ID | An MFSI/GID-L subfield includes the received value of an MSI included within a frame related to MFB information if an unsolicited MFB subfield is set to "0." An MFSI/GID-L subfield includes the lowest three bits of a group ID of a PPDU estimated by an MFB if an MFB is estimated from an MU PPDU. |
| MFB | VHT N_STS, MCS, BW, SNR feedback | An MFB subfield includes recommended MFB. VHT-MCS = 15, NUM_STS = 7 indicates that feedback is not present. |
| GID-H | MSB of group ID | A GID-H subfield includes the most significant bit 3 bits of a group ID of a PPDU whose solicited MFB has been estimated if an unsolicited MFB field is set to "1" and MFB has been estimated from a VHT MU PPDU. All of GID-H subfields are set to "1" if MFB is estimated from an SU PPDU. |
| Coding Type | Coding type or MFB response | If an unsolicited MFB subfield is set to "1", a coding type subfield includes the coding type (binary convolutional code (BCC) includes 0 and low-density parity check (LDPC) includes 1) of a frame whose solicited MFB has been estimated |
| FB Tx Type | Transmission type of MFB response | An FB Tx Type subfield is set to "0" if an unsolicited MFB subfield is set to "1" and MFB has been estimated from an unbeamformed VHT PPDU. An FB Tx Type subfield is set to "1" if an unsolicited MFB subfield is set to "1" and MFB has been estimated from a beamformed VHT PPDU. |
| Unsolicited MFB | Unsolicited MCS feedback indicator | Set to "1" if MFB is a response to MRQ Set to "0" if MFB is not a response to MRQ |

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field, additional fields may be further included, and all of the fields may not be essentially included.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 7 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to 2^n−1 (n=0, 1, 2, . . . , ).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 7, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 7 shows that the STA 2 has selected the smallest backoff count value and the STA 1 has selected the greatest backoff count value. That is, FIG. 7 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 7 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the duration field of the MAC header of a frame, for example.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

Interframe Space (IFS)

A time interval between frames is defined as an interframe space (IFS). An STA may determine whether a channel is used during an IFS time interval through carrier sensing (including physical carrier and virtual carrier sensing). In an 802.11 WLAN system, a plurality of IFSs is defined in order to provide a priority level by which a wireless medium is occupied.

FIG. 8 is a diagram illustrating an IFS relation in a wireless communication system to which an embodiment of the present invention may be applied.

All of pieces of timing may be determined with reference to physical layer interface primitives, that is, a PHY-TX-END.confirm primitive, a PHYTXSTART.confirm primitive, a PHY-RXSTART.indication primitive, and a PHY-RXEND.indication primitive.

An interframe space (IFS) depending on an IFS type is as follows.

a) A reduced interframe space (IFS) (RIFS)
b) A short interframe space (IFS) (SIFS)
c) A PCF interframe space (IFS) (PIFS)

d) A DCF interframe space (IFS) (DIFS)
e) An arbitration interframe space (IFS) (AIFS)
f) An extended interframe space (IFS) (EIFS)

Different IFSs are determined based on attributes specified by a physical layer regardless of the bit rate of an STA. IFS timing is defined as a time gap on a medium. IFS timing other than an AIFS is fixed for each physical layer.

The SIFS is used to transmits a PPDU including an ACK frame, a CTS frame, a block ACK request (BlockAckReq) frame, or a block ACK (BlockAck) frame, that is, an instant response to an A-MPDU, the second or consecutive MPDU of a fragment burst, and a response from an STA with respect to polling according to a PCF. The SIFS has the highest priority. Furthermore, the SIFS may be used for the point coordinator of frames regardless of the type of frame during a non-contention period (CFP) time. The SIFS indicates the time prior to the start of the first symbol of the preamble of a next frame which is subsequent to the end of the last symbol of a previous frame or from signal extension (if present).

SIFS timing is achieved when the transmission of consecutive frames is started in a Tx SIFS slot boundary.

The SIFS is the shortest in IFS between transmissions from different STAs. The SIFS may be used if an STA occupying a medium needs to maintain the occupation of the medium during the period in which the frame exchange sequence is performed.

Other STAs required to wait so that a medium becomes an idle state for a longer gap can be prevented from attempting to use the medium because the smallest gap between transmissions within a frame exchange sequence is used. Accordingly, priority may be assigned in completing a frame exchange sequence that is in progress.

The PIFS is used to obtain priority in accessing a medium. The PIFS may be used in the following cases.

An STA operating under a PCF
An STA sending a channel switch announcement frame
An STA sending a traffic indication map (TIM) frame
A hybrid coordinator (HC) starting a CFP or transmission opportunity (TXOP)
An HC or non-AP QoS STA, that is, a TXOP holder polled for recovering from the absence of expected reception within a controlled access phase (CAP)
An HT STA using dual CTS protection before sending CTS2
A TXOP holder for continuous transmission after a transmission failure
A reverse direction (RD) initiator for continuous transmission using error recovery
An HT AP during a PSMP sequence in which a power save multi-poll (PSMP) recovery frame is transmitted
An HT AT performing CCA within a secondary channel before sending a 40 MHz mask PPDU using EDCA channel access In the illustrated examples, an STA using the PIFS starts transmission after a carrier sense (CS) mechanism for determining that a medium is an idle state in a Tx PIFS slot boundary other than the case where CCA is performed in a secondary channel.

The DIFS may be used by an STA which operates to send a data frame (MPDU) and a MAC management protocol data unit management (MMPDU) frame under the DCF. An STA using the DCF may transmit data in a TxDIFS slot boundary if a medium is determined to be an idle state through a carrier sense (CS) mechanism after an accurately received frame and a backoff time expire. In this case, the accurately received frame means a frame indicating that the PHY-RXEND.indication primitive does not indicate an error and an FCS indicates that the frame is not an error (i.e., error free).

An SIFS time ("aSIFSTime") and a slot time ("aSlotTime") may be determined for each physical layer. The SIFS time has a fixed value, but the slot time may be dynamically changed depending on a change in the wireless delay time "aAirPropagationTime."

The "aSIFSTime" is defined as in Equations 1 and 2 below.

$$aSIFSTime(16\ \mu s)=aRxRFDelay(0.5)+aRxPLCPDelay(12.5)+aMACProcessingDelay(1\ or\ <2)+aRxTxTurnaroundTime(<2) \qquad [\text{Equation 1}]$$

$$aRxTxTurnaroundTime=aTxPLCPDelay(1)+aRxTxSwitchTime(0.25)+aTxRampOnTime(0.25)+aTxRFDelay(0.5) \qquad [\text{Equation 2}]$$

The "aSlotTime" is defined as in Equation 3 below.

$$aSlotTime=aCCATime(<4)+aRxTxTurnaroundTime(<2)+aAirPropagatonTime(<1)+aMACProcessingDelay(<2) \qquad [\text{Equation 3}]$$

In Equation 3, a default physical layer parameter is based on "aMACProcessingDelay" having a value which is equal to or smaller than 1 µs. A radio wave is spread 300 m/µs in the free space. For example, 3 µs may be the upper limit of a BSS maximum one-way distance ~450 m (a round trip is ~900 m).

The PIFS and the SIFS are defined as in Equations 4 and 5, respectively.

$$PIFS(16\ \mu s)=aSIFSTime+aSlotTime \qquad [\text{Equation 4}]$$

$$DIFS(34\ \mu s)=aSIFSTime+2*aSlotTime \qquad [\text{Equation 5}]$$

In Equations 1 to 5, the numerical value within the parenthesis illustrates a common value, but the value may be different for each STA or for the position of each STA.

The aforementioned SIFS, PIFS, and DIFS are measured based on an MAC slot boundary (e.g., a Tx SIFS, a Tx PIFS, and a TxDIFS) different from a medium.

The MAC slot boundaries of the SIFS, the PIFS, and the DIFS are defined as in Equations 6 to 8, respectively.

$$TxSIFS=SIFS-aRxTxTurnaroundTime \qquad [\text{Equation 6}]$$

$$TxPIFS=TxSIFS+aSlotTime \qquad [\text{Equation 7}]$$

$$TxDIFS=TxSIFS+2*aSlotTIme \qquad [\text{Equation 8}]$$

Downlink (DL) MU-MIMO Frame

FIG. 9 is a diagram illustrating a DL multi-user (MU) PPDU format in a wireless communication system to which an embodiment of the present invention may be applied.

Referring to FIG. 9, the PPDU is configured to include a preamble and a data field. The data field may include a service field, a scrambled PSDU field, tail bits, and padding bits.

An AP may aggregate MPDUs and transmit a data frame using an aggregated MPDU (A-MPDU) format. In this case, a scrambled PSDU field may include the A-MPDU.

The A-MPDU includes a sequence of one or more A-MPDU subframes.

In the case of a VHT PPDU, the length of each A-MPDU subframe is a multiple of 4 octets. Accordingly, an A-MPDU may include an end-of-frame (EOF) pad of 0 to 3 octets after the last A-MPDU subframe in order to match the A-MPDU up with the last octet of a PSDU.

The A-MPDU subframe includes an MPDU delimiter, and an MPDU may be optionally included after the MPDU delimiter. Furthermore, a pad octet is attached to the MPDU in order to make the length of each A-MPDU subframe in a multiple of 4 octets other than the last A-MPDU subframe within one A-MPDU.

The MPDU delimiter includes a reserved field, an MPDU length field, a cyclic redundancy check (CRC) field, and a delimiter signature field.

In the case of a VHT PPDU, the MPDU delimiter may further include an end-of-frame (EOF) field. If an MPDU length field is 0 and an A-MPDU subframe or A-MPDU used for padding includes only one MPDU, in the case of an A-MPDU subframe on which a corresponding MPDU is carried, the EOF field is set to "1." If not, the EOF field is set to "0."

The MPDU length field includes information about the length of the MPDU.

If an MPDU is not present in a corresponding A-MPDU subframe, the MPDU length field is set to "0." An A-MPDU subframe in which an MPDU length field has a value of "0" is used to be padded to a corresponding A-MPDU in order to match the A-MPDU up with available octets within a VHT PPDU.

The CRC field includes CRC information for an error check. The delimiter signature field includes pattern information used to search for an MPDU delimiter.

Furthermore, the MPDU includes an MAC header, a frame body, and a frame check sequence (FCS).

FIG. 10 is a diagram illustrating a DL multi-user (MU) PPDU format in a wireless communication system to which an embodiment of the present invention may be applied.

In FIG. 10, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 10, the MU PPDU is configured to include L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs. Accordingly, an STA which is not a member STA of a corresponding group ID or which is a member of a corresponding group ID, but in which the number of streams allocated to the STA is "0" is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All of MPDUs transmitted within the VHT MU PPDU based on 802.11ac are included in the A-MPDU. In the data field of FIG. 10, each VHT A-MPDU may be transmitted in a different stream.

In FIG. 10, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 may be called a null subframe.

As described above, in the null subframe, the EOF field of the MPDU delimiter is set to "1." Accordingly, when the EOF field set to 1 is detected in the MAC layer of an STA on the receiving side, the reception of the physical layer is stopped, thereby being capable of reducing power consumption.

UL Multiple User (MU) Transmission Method

A new frame format and numerology for an 802.11ax system, that is, the next-generation WLAN system, are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11ax WLAN system may also operate in a higher 60 GHz frequency band.

In the IEEE 802.11ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

Hereinafter, in a description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise.

FIG. 11 is a diagram illustrating a high efficiency (HE) format PPDU according to an embodiment of the present invention.

FIG. 11(a) illustrates a schematic configuration of the HE format PPDU, and FIGS. 21(b) to 21(d) illustrate more detailed configurations of the HE format PPDU.

Referring to FIG. 11(a), the HE format PPDU for an HEW may basically include a legacy part (L-part), an HE-part, and an HE-data field.

The L-part includes an L-STF, an L-LTF, and an L-SIG field as in a form maintained in the existing WLAN system. The L-STF, the L-LTF, and the L-SIG field may be called a legacy preamble.

The HE-part is a part newly defined for the 802.11ax standard and may include an HE-STF, an HE-SIG field, and an HE-LTF. In FIG. 25(a), the sequence of the HE-STF, the HE-SIG field, and the HE-LTF is illustrated, but the HE-STF, the HE-SIG field, and the HE-LTF may be configured in a different sequence. Furthermore, the HE-LTF may be omitted. Not only the HE-STF and the HE-LTF, but the HE-SIG field may be commonly called an HE-preamble ("preamble").

Furthermore, the L-part and the HE-part (or HE-preamble) may be commonly called a physical (PHY) preamble.

The HE-SIG may include information (e.g., OFDMA, UL MU MIMO, and improved MCS) for decoding the HE-data field.

The L-part and the HE-part may have different fast Fourier transform (FFT) sizes (i.e., different subcarrier spacing) and use different cyclic prefixes (CPs).

In an 802.11ax system, an FFT size four times (4×) larger than that of a legacy WLAN system may be used. That is, the L-part may have a 1 × symbol structure, and the HE-part (more specifically, HE-preamble and HE-data) may have a 4× symbol structure. In this case, the FFT of a 1×, 2×, or 4× size means a relative size for a legacy WLAN system (e.g., IEEE 802.11a, 802.11n, and 802.11ac).

For example, if the sizes of FFTs used in the L-part are 64, 128, 256, and 512 in 20 MHz, 40 MHz, 80 MHz, and 160 MHz, respectively, the sizes of FFTs used in the HE-part may be 256, 512, 1024, and 2048 in 20 MHz, 40 MHz, 80 MHz, and 160 MHz, respectively.

If an FFT size is larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Furthermore, if the IDFT/DFT period of the L-part is 3.2 µs (=1/312.5 kHz), the IDFT/DFT period of the HE-part may be 12.8 µs (=1/78.125 kHz).

In this case, since one of 0.8 µs, 1.6 µs, and 3.2 µs may be used as a GI, the OFDM symbol length (or symbol interval) of the HE-part including the GI may be 13.6 µs, 14.4 µs, or 16 µs depending on the GI.

Referring to FIG. 11 (b), the HE-SIG field may be divided into an HE-SIG-A field and an HE-SIG-B field.

For example, the HE-part of the HE format PPDU may include an HE-SIG-A field having a length of 12.8 µs, an HE-STF of 1 OFDM symbol, one or more HE-LTFs, and an HE-SIG-B field of 1 OFDM symbol.

Furthermore, in the HE-part, an FFT size four times larger than that of the existing PPDU may be applied from the HE-STF other than the HE-SIG-A field. That is, FFTs having 256, 512, 1024, and 2048 sizes may be applied from the HE-STFs of the HE format PPDUs of 20 MHz, 40 MHz, 80 MHz, and 160 MHz, respectively.

In this case, if the HE-SIG field is divided into the HE-SIG-A field and the HE-SIG-B field as in FIG. 11(b), the positions of the HE-SIG-A field and the HE-SIG-B field may be different from those of FIG. 21(b). For example, the HE-SIG-B field may be transmitted after the HE-SIG-A field, and the HE-STF and the HE-LTF may be transmitted after the HE-SIG-B field. In this case, an FFT size four times larger than that of the existing PPDU may be applied from the HE-STF.

Referring to FIG. 11(c), the HE-SIG field may not be divided into an HE-SIG-A field and an HE-SIG-B field.

For example, the HE-part of the HE format PPDU may include an HE-STF of 1 OFDM symbol, an HE-SIG field of 1 OFDM symbol, and one or more HE-LTFs.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

Referring to FIG. 11(d), the HE-SIG field is not divided into an HE-SIG-A field and an HE-SIG-B field, and the HE-LTF may be omitted.

For example, the HE-part of the HE format PPDU may include an HE-STF of 1 OFDM symbol and an HE-SIG field of 1 OFDM symbol.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

The HE format PPDU for a WLAN system according to an embodiment of the present invention may be transmitted through at least one 20 MHz channel. For example, the HE format PPDU may be transmitted in a 40 MHz, 80 MHz or 160 MHz frequency band through a total of four 20 MHz channels. This is described in more detail.

FIG. 12 is a diagram illustrating an HE PPDU format according to an embodiment of the present invention.

In the embodiment of FIG. 12, an HE-SIG 1 (or an HE-SIG A) field is placed behind an L-part (i.e., an L-STF, an L-LTF, and an L-SIG field) using the legacy numerology, and may be duplicated in a 20 MHz unit like the L-part. The HE-SIG-1 field may include common information (e.g., a BW, a GI length, a BSS index, CRC, and tail). 4xFFT may be applied to the HE-data field, and 1024 FFT may be used in the HE-data field.

FIG. 13 is a diagram illustrating an HE PPDU format according to an embodiment of the present invention.

In the embodiment of FIG. 13, an HE-SIG A field may further include user allocation information (e.g., the ID (e.g., PAID or GID) of an STA and resource allocation information N_sts) in addition to the common information. Furthermore, an HE-SIG 1 field may be transmitted depending on resource allocation of OFDMA. In the case of MU-MIMO, an HE-SIG 2 (HE-SIG B) field may be identified by an STA through SDM. An HE-SIG B field may include additional user allocation information (e.g., an MCS, coding, STBC, and TSBF).

FIG. 14 is a diagram illustrating an HE PPDU format according to an embodiment of the present invention.

In the embodiment of FIG. 14, an HE-SIG 1 field and an HE-SIG 2 field may be included behind a legacy preamble, and an HE-STF and an HE-LTF may be subsequently included. The HE-SIG 2 field may be transmitted behind the HE-SIG 1 field over the entire band using information (numerology) of the HE-SIG 1 field. The HE-SIG 2 field may include user allocation information (e.g., the ID (e.g., PAID or GID) of an STA and resource allocation information N_sts).

The HE-STF and the HE-LTF may be included in a corresponding resource unit band depending on resource allocation of an OFDMA scheme for each user as in FIG. 12.

A multi-user UL transmission method in a WLAN system is described below.

A method of transmitting, by an AP operating in a WLAN system, data to a plurality of STAs on the same time resource may be called downlink multi-user (DL MU) transmission. In contrast, a method of transmitting, by a plurality of STAs operating in a WLAN system, data to an AP on the same time resource may be called uplink multi-user (UL MU) transmission.

Such DL MU transmission or UL MU transmission may be multiplexed on a frequency domain or a space domain.

If DL MU transmission or UL MU transmission is multiplexed on the frequency domain, different frequency resources (e.g., subcarriers or tones) may be allocated to each of a plurality of STAs as DL or UL resources based on orthogonal frequency division multiplexing (OFDMA). A transmission method through different frequency resources in such the same time resources may be called "DL/UL MU OFDMA transmission."

If DL MU transmission or UL MU transmission is multiplexed on the space domain, different spatial streams may be allocated to each of a plurality of STAs as DL or UL resources. A transmission method through different spatial streams on such the same time resources may be called "DL/UL MU MIMO transmission."

Current WLAN systems do not support UL MU transmission due to the following constraints.

Current WLAN systems do not support synchronization for the transmission timing of UL data transmitted by a plurality of STAs. For example, assuming that a plurality of STAs transmits UL data through the same time resources in the existing WLAN system, in the present WLAN systems, each of a plurality of STAs is unaware of the transmission timing of UL data of another STA. Accordingly, an AP may not receive UL data from each of a plurality of STAs on the same time resource.

Furthermore, in the present WLAN systems, overlap may occur between frequency resources used by a plurality of STAs in order to transmit UL data. For example, if a plurality of STAs has different oscillators, frequency offsets may be different. If a plurality of STAs having different frequency offsets performs UL transmission at the same time through different frequency resources, frequency regions used by a plurality of STAs may partially overlap.

Furthermore, in existing WLAN systems, power control is not performed on each of a plurality of STAs. An AP dependent on the distance between each of a plurality of STAs and the AP and a channel environment may receive signals of different power from a plurality of STAs. In this case, a signal having weak power may not be relatively detected by the AP compared to a signal having strong power.

Accordingly, an embodiment of the present invention proposes an UL MU transmission method in a WLAN system.

FIG. 15 is a diagram illustrating an UL multi-user (UL MU) transmission procedure according to an embodiment of the present invention.

Referring to FIG. 15, an AP commands STAs participating in UL MU transmission to prepare UL MU transmission, receives UL MU data frames from the corresponding STAs, and transmits an ACK frame (or a block ACK (BA) frame) as a response to the UL MU data frames.

First, the AP commands the STAs which will transmit UL MU data to prepare UL MU transmission by transmitting an UL MU trigger frame 1510 including various information for UL MU transmission. In this case, the UL MU trigger frame may also be called an "UL MU scheduling frame" or a "trigger frame."

In this case, the UL MU trigger frame 1510 may include control information, such as STA identifier (ID)/address information, information about the allocation of resources to be used by each STA, and duration information, that is, information for UL MU transmission.

The STA ID/address information means information about an identifier or address for specifying each STA which transmits UL data.

The resource allocation information means information about UL transmission resource (e.g., information about a frequency/subcarrier allocated to each STA in the case of UL MU OFDMA transmission and the index of a stream allocated to each STA in the case of UL MU MIMO transmission) allocated to each STA.

The duration information means information for determining time resources for transmitting an UL data frame transmitted by each of a plurality of STAs.

For example, the duration information may include information about the interval of a transmit opportunity (TXOP) allocated for the UL transmission of each STA or information (e.g., a bit or symbol) about the length of an UL frame.

Furthermore, the UL MU trigger frame 1510 may further include control information, such as information about an MCS to be used by each STA for UL MU data frame transmission, coding information, SU/MU information, power adjustment information, stream number information, STBC information, and beamforming information, that is, information for UL MU transmission.

Such control information may be transmitted in the HE-part (e.g., the HE-SIG A field or the HE-SIG B field) of a PPDU in which the UL MU trigger frame 1510 is delivered or in the control field of the UL MU trigger frame 1510 (e.g., the frame control field of an MAC frame).

Furthermore, the UL MU trigger frame 1510 may be defined to have a new format in an 802.11ax system, and may include allocation resource information about UL MU PPDUs and pieces of important information for checking STAs which transmit UL MU PPDUs. The UL MU format of the trigger frame is described in more detail later with reference to FIG. 19.

The PPDU in which the UL MU trigger frame 1510 is delivered has a structure that starts from an L-part (e.g., an L-STF, an L-LTF, and an L-SIG field). Accordingly, legacy STAs may perform network allocation vector (NAV) setting through L-SIG protection from the L-SIG field. For example, the legacy STAs may calculate an interval for the NAV setting (hereinafter referred to as an "L-SIG guard interval") based on a data length and data rate information in the L-SIG field. Furthermore, the legacy STAs may determine that there is no data to be transmitted thereto during the calculated L-SIG guard interval.

For example, the L-SIG guard interval may be determined to be the sum of the value of the MAC duration field of the UL MU trigger frame 1510 and the remaining interval after the L-SIG field of the PPDU that carries the UL MU trigger frame 1510. Accordingly, the L-SIG guard interval may be set as a value up to the interval in which an ACK frame 1530 (or BA frame) transmitted to each STA is transmitted based on the MAC duration value of the UL MU trigger frame 1510.

The STAs transmit respective UL MU data frames 1521, 1522 and 1523 to the AP based on the UL MU trigger frame 1510 transmitted by the AP. In this case, the STAs may receive the UL MU trigger frame 1510 from the AP and then transmit the UL MU data frames 1521, 1522 and 1523 to the AP after an SIFS.

Each of the STAs may determine a specific frequency resource for UL MU OFDMA transmission or a spatial stream for UL MU MIMO transmission based on the resource allocation information of the UL MU trigger frame 1510.

More specifically, in the case of UL MU OFDMA transmission, each STA may transmit the UL MU data frame on the same time resource through a different frequency resource.

In this case, different frequency resources for the UL data frame transmission may be allocated to the STA 1 to the STA 3 based on the STA ID/address information and resource allocation information included in the UL MU trigger frame 1510. For example, the STA ID/address information may sequentially indicate the STA 1 to the STA 3, and the resource allocation information may sequentially indicate a frequency resource 1, a frequency resource 2, and a frequency resource 3. In this case, the frequency resource 1, the frequency resource 2, and the frequency resource 3 sequentially indicated based on the resource allocation information may be allocated to the STA 1 to the STA 3 sequentially indicated based on the STA ID/address information. That is, the STA 1, the STA 2, and the STA 3 may transmit the respective UL data frames 1521, 1522 and 1523 to the AP through the frequency resource 1, the frequency resource 2, and the frequency resource 3, respectively.

Furthermore, in the case of UL MU MIMO transmission, each STA may transmit the UL data frame on the same time resource through at least one different of a plurality of spatial streams.

In this case, a spatial stream for the UL data frame transmission may be allocated to each of the STA 1 to the STA 3 based on the STA ID/address information and resource allocation information included in the UL MU trigger frame 1510. For example, the STA ID/address information may sequentially indicate the STA 1 to the STA 3, and the resource allocation information may sequentially indicate a spatial stream 1, a spatial stream 2, and a spatial stream 3. In this case, the spatial stream 1, the spatial stream 2, and the spatial stream 3 sequentially indicated based on the resource allocation information may be respectively allocated to the STA 1 to the STA 3 sequentially indicated based on the STA ID/address information. That is, the STA 1, the STA 2, and the STA 3 may transmit the respective UL data frames 1521, 1522 and 1523 to the AP through the spatial stream 1, the spatial stream 2, and the spatial stream 3, respectively.

The PPDU in which the UL data frames 1521, 1522 and 1523 are delivered may be configured to have a new structure even without an L-part.

Furthermore, in the case of UL MU MIMO transmission or UL MU OFDMA transmission having a subband form of less than 20 MHz, the L-part of the PPDU in which the UL data frames 1521, 1522 and 1523 are delivered may be transmitted in an SFN form (i.e., all of STAs transmit the same L-part configuration and contents at the same time). In contrast, in the case of UL MU OFDMA transmission having a subband form of 20 MHz or more, the L-part of the PPDU in which the UL data frames 1521, 1522 and 1523 are delivered may be transmitted in a 20 MHz unit in a band allocated to each STA.

If the UL data frame can be sufficiently configured based on the information of the UL MU trigger frame 1510, there may be no need for an HE-SIG field (i.e., an area in which control information for a method for configuring a data frame is transmitted) within the PPDU in which the UL data frames 1521, 1522 and 1523 are delivered. For example, the HE-SIG-A field and/or the HE-SIG-B may not be transmitted. Furthermore, the HE-SIG-A field and the HE-SIG-C field may be transmitted, but the HE-SIG-B field may not be transmitted.

The AP may transmit the ACK frame 1530 (or the BA frame) as a response to the UL data frames 1521, 1522 and 1523 received from the respective STAs. In this case, the AP may receive the UL data frames 1521, 1522 and 1523 from the respective STAs and then transmit the ACK frame 1530 to each of the STAs after an SIFS.

If the structure of the existing ACK frame is identically used, the existing ACK frame may be configured to include the AIDs (or part AIDs) of STAs participating in UL MU transmission in an RA field having a size of 6 octets.

Alternatively, if an ACK frame of a new structure is configured, the ACK frame may be configured in a form for DL SU transmission or DL MU transmission.

The AP may transmit only the ACK frame 1530 for an UL MU data frame that has been successfully received to a corresponding STA. Furthermore, the AP may provide notification of whether an UL MU data frame has been successfully received through the ACK frame 1530 using ACK or NACK. If the ACK frame 1530 includes NACK information, the ACK frame may include a reason of NACK or information for a subsequent procedure (e.g., UL MU scheduling information).

Alternatively, the PPDU in which the ACK frame 1530 is delivered may be configured to have a new structure without the L-part.

The ACK frame 1530 may include STA ID or address information, but STA ID or address information may be omitted if the sequence of STAs indicated in the UL MU trigger frame 1510 is identically applied.

Furthermore, the TXOP (i.e., the L-SIG guard interval) of the ACK frame 1530 may be extended so that a frame for next UL MU scheduling or a control frame including adjustment information for next UL MU transmission can be included in the TXOP.

For the UL MU transmission, an adjustment process for synchronizing the STAs may be added.

FIG. 16 is a diagram showing embodiments regarding an UL/DL MU transmission operation between an AP and STAs.

Referring to FIG. 16(a), an AP may transmit a beacon frame, including a traffic indication map (TIM), to STAs. Furthermore, the AP may transmit a trigger frame for UL MU PS-poll frame transmission after a start offset indicated in the beacon frame. In this case, the STAs may enter into a doze state during the section indicated by the start offset. Furthermore, the STAs may receive the trigger frame, and may transmit UL MU PS-poll frames after an SIFS. The AP may receive the MU PS-poll frames, and may transmit a DL MU data frame or an ACK frame as a response to the MU PS-poll frames after the SIFS.

Referring to FIG. 16(b), an AP may transmit a DL MU data frame. Furthermore, the AP may transmit DL MU data, and may transmit a trigger frame for UL MU ACK frames or UL MU BA frames after an SIFS or immediately. In this case, STAs may receive the trigger frame, and may transmit UL MU ACK frames and UL MU BA frames after an SIFS. Alternatively, the STAs may transmit the UL MU ACK frames and the UL MU BA frames after performing a contention for the transmission of UL frames.

Referring to FIG. 16(c), an AP may transmit a trigger frame for an UL MU resource request/buffer status report. STAs may receive the trigger frame, and may transmit UL MU resource requests/buffer status report (BS) frames after an SIFS. When the AP sends the trigger frame, the STAs may contend with each other in order to access a medium and obtain a TXOP for UL MU transmission. In this case, the STAs may receive the trigger frame, and may transmit the UL data frames of a format indicated by the AP after an SIFS. Alternatively, after contending with each other in order to send UL frames, the STAs may transmit the UL data frames of a format indicated by the AP. The AP may respond to the received UL data frames using an ACK frame.

FIG. 17 is a diagram showing embodiments regarding an UL/DL MU transmission operation between an AP and STAs.

Referring to FIG. 17(a), an AP may transmit a trigger frame for UL MU CTS frames after a contention for accessing a medium. In this case, STAs may receive the trigger frame, and may transmit the UL MU CTS frames after an SIFS. The AP may receive the UL MU CTS frames, and may transmit a DL MU data frame after an SIFS.

Referring to FIG. 17(b), an AP may transmit a trigger frame for UL MU NDP frames. STAs may receive the trigger frame, and may transmit UL MU NDP frames after an SIFS or after a channel contention for transmitting UL frames.

FIG. 18 is a diagram illustrating a multi-user (MU) transmission procedure according to an embodiment of the present invention.

As shown in FIG. 18(a), an AP may transmit a DL MU frame and a trigger frame (or trigger information) (not shown) using the same time resource (or at the same time). In this case, the DL MU frame and the trigger frame may be included in the same DL MU PPDU and may be subjected to DL MU transmission at the same time. STAs that have received both the trigger frame and the DL MU frame from the AP may perform UL MU transmission on ACK frames (or block ACK (BA) frames), that is, responses to the UL MU frame and the DL MU frame corresponding to the trigger frame, using one UL MU PPDU. That is, the STAs may perform UL MU transmission on one UL MU PPDU, including the UL MU frames and the ACK frames, in accordance with the received DL MU PPDU. In this case, time resources can be reduced and data transmission efficiency can be improved because overhead attributable to an additional trigger frame, an SIFS, and a physical preamble is reduced.

In accordance with the aforementioned embodiment, the DL MU PPDU and the UL MU PPDU may be transmitted/received in a cascaded manner, as shown FIG. 18(b).

FIG. 19 is a diagram showing the format of a trigger frame according to an embodiment of the present invention.

Referring to FIG. 19, a trigger frame may include a frame control field FC, a duration/ID field Duration, a common information field Common Info, a user-specific information field Per User Info 1~Per User Info N, and FCS. Descriptions of the frame control field, the duration/ID field, and the FCS are the same as those described with reference to FIG. 5.

The common information field indicates a field including common information that is required for all of STAs in common. The user-specific information field indicates a field including user-specific information that is individually required for a specific STA. The user-specific information field may be included in a trigger frame by the number of STAs receiving user-specific information. User-specific information included in each field may be information for a specific STA.

An 802.11 system has been generally described above. Hereinafter, a method for performing CCA in the existing system and a procedure for transmitting a CTS/RTS, which are related to an embodiment of the present invention, are described. An UL MU transmission method related to the execution of CCA according to an embodiment of the present invention is described in detail.

Method for Executing CCA (802.11ac)

Before sending a frame through a channel, an STA may check CCA by performing energy detection on the corresponding channel. The STA may observe the channel during a CCA observation time. In this case, the CCA observation time may be less than 18 µs. If the energy level of the observed channel does not exceed a threshold corresponding to a preset power level, the channel may be considered to be an idle (or clear) state, and the STA may transmit the frame through the channel.

In contrast, if the energy level of the observed channel exceeds the threshold corresponding to the preset power level, the channel may be considered to be a busy (or occupied) state, and the STA may not transmit the frame through the channel. In this case, the STA may perform an extended CCA check on the observed channel during a random time between 18 µs and at least 160 µs. In this case, if the STA determines that the observed channel is no longer the busy state through the extended CCA check, the STA may resume transmission for the channel (if there is no transmission during a specific period in which the extended CCA check is performed, the specific time may be considered to be an idle time (or an idle period) between transmissions). The STA may continue to perform the transmission of short control signaling through the channel.

If data is transmitted at the same time through a plurality of channel (contiguous or non-contiguous channels), the STA may continue to transmit data through a separate channel in which other signals have not been detected by performing a CCA check.

A total of time when the STA transmits the data using the channel may be up to a maximum channel occupation time after the STA performs new CCA. In this case, the maximum channel occupation time may be less than 10 ms.

When the STA successfully receives a packet, it may skip CCA and immediately transmit management and control frames (e.g., an ACK frame or a block ACK frame). In this case, the time during which the STA continues to transmit the frames without performing new CCA does not exceed the maximum channel occupation time. In this case, the transmission of the ACK frame (associated with the same data packet) of each of STAs for multicast transmission may continue to be performed.

A power level for the transmission may be 23 dBm e.i.r.p. or more. In a reception stage, a CCA threshold level (TL) may be a minimum −73 dBm/MHz (estimated as 0 dBm in an antenna). In the transmission of a power level of 23 dBm or less, a CCA threshold level(TL=−73 dBm/MHz+(23 dBm−PH)/(1 MHz)) in a reception stage may be proportional to maximum transmission power (PH).

CTS/RTS Transmission Procedure

In an 802.11ac system, an STA that receives an RTS frame may take into consideration an NAV in order to determine whether or not to send a CTS frame as a response to the received RTS frame (if the NAV has not been set by a frame transmitted by an STA that has transmitted the RTS frame).

If the NAV indicates an idle state and CCA indicates that all of secondary channels (e.g., a secondary 20 MHz channel, a secondary 40 MHz channel, and a secondary 80 MHz channel) included in a channel width indicated by the RTS frame are an idle state during a PIFS before the start of the RTS frame (when a specific channel is idle in the case of dynamic allocation and when all of channels are idle in the case of static allocation), a VHT STA, may receive the RTS frame, and may transmit a CTS frame as a response to the RTS frame after an SIFS. In contrast, if the NAV does not indicate idle and the CCA is not an idle state, the VHT STA may not transmit a CTS frame as a response to the RTS frame. In this case, what the "NAV indicates an idle state" may be defined as i) a case where an NAV count value is "0", ii) a case where an NAV count value is not "0" (i.e., non-zero), but a non-bandwidth signaling TA transmitted in the TA field of a trigger frame is the same as the address of a TXOP holder, or iii) a case where an NAV count value is not "0", but an NAV is set as busy by an MyBSS packet.

If an NAV indicates an idle state, a non-VHT STA may receive an RTS frame, and may transmit a CTS frame as a response to the RTS frame after an SIFS. In contrast, if the NAV does not indicate idle, the non-VHT STA may not transmit a CTS frame.

The method for executing CCA and the CTS/RTS transmission procedure in the existing system have been described above. An UL MU transmission method related to the execution of CCA according to an embodiment of the present invention is described in detail below.

UL Multi-user (MU) Transmission Method in Which CCA Results Have Been Taken into Consideration A trigger frame may also trigger the transmission of a short management/control frame in addition to an UL MU data frame. In this case, the short management/control frame may indicate a management or control frame having a length shorter than a preset length, and may correspond to a PS-poll, ACK/BA, a resource request/buffer status report, CTS, or an NDP frame, for example.

In an 802.11ax system, if an STA receives at least one frame including the MAC address (or RA) of another STA other than its own MAC address, the STA may update an NAV based on duration field information within a PSDU included in the corresponding frame or may set an NAV count value as non-zero. In an 802.11ax system, however, a TXOP sequence may include a different UL transmission stage (or transmitter) within each UL MU PPDU. Accordingly, although the NAV count value is non-zero, an STA may need to transmit an UL MU frame in response to a received trigger frame during the set MU TXOP. For example, it may be assumed that an AP is a TXOP holder that has transmitted a trigger frame to STAs 1~3 and the STA 3 is an STA whose NAV has been updated. In this case, if the STA 3 receives a trigger frame therefor, the STA 3 may need to transmit an UL MU frame as a response to the received trigger frame regardless of whether the NAV has been updated or not (or an NAV count value).

Accordingly, as in the method for transmitting RTS and CTS frames in the legacy system, in an 802.11ax system, STAs that have received a trigger frame may be configured to transmit UL MU data frame(s), short management/control frame(s), etc. through corresponding channels if i) an NAV indicates an idle state and ii) channels (e.g., secondary channels) are an idle state (i.e., if a specific channel is an idle state in the case of dynamic allocation and if all of channels are idle in the case of static allocation). In this case, as described above, what the "NAV indicates an idle state" may be defined as i) a case where an NAV count value is "0", ii) a case where an NAV count value is not "0" (i.e., non-zero), but TA transmitted in the TA field of a trigger frame is the same as the address of a TXOP holder, or iii) a case where an NAV count value is not "0", but an NAV is set as busy by an MyBSS packet.

In this case, if an AP transmits a trigger frame through a channel of an idle state and STAs transmit UL MU frames as a response to the trigger frame through the same channel, the probability that the AP may successfully receive the UL MU frames is high. Furthermore, the probability that each STA may successfully receive an ACK/BA frame transmitted by the AP through the same channel is also high.

More specifically, since a short frame has a short transmission time, the probability that the short frame may affect another AP or STA in an overlapping basic service set (OBSS) situation is low. Accordingly, if a trigger frame triggers the transmission of a short management/control frame, it may be more efficient that an STA receives the trigger frame regardless of whether a channel according to a result of carrier sensing is idle or not and then transmits the short management/control frame after an SIFS. In this case, the carrier sensing is a concept generally covering a physical carrier sense mechanism and a virtual carrier sense mechanism. Whether an NAV indicates an idle state may be determined by the virtual carrier sense mechanism (or results of virtual carrier sensing). Whether CCA is idle may be determined by the physical carrier sense mechanism (or the results of physical carrier sensing).

Accordingly, various embodiments of an STA operation for transmitting an UL MU frame (e.g., an UL MU data frame or a short management/control frame) as a response to a trigger frame without reflecting (or considering) a result of carrier sensing (CCA results and an NAV state) are described below. For convenience of description, UL MU transmission is basically described, but the present invention is not limited thereto. Contents to be described later may be identically applied to UL SU transmission.

First Embodiment

An STA that has received a trigger frame may check that a channel (or a channel allocated to the STA) through which an UL MU PPDU (or an UL MU frame) will be transmitted is an idle state by checking (or performing) CCA for the channel, and may then transmit the UL MU PPDU through the corresponding channel. Accordingly, a collision between signals can be prevented when the UL MU PPDU is transmitted.

Second Embodiment

An STA that has received a trigger frame may transmit an UL MU PPDU (or an UL MU frame) through a channel (or a channel allocated to the STA) through which the UL MU PPDU will be transmitted regardless of a result of CCA for the corresponding channel. That is, in the present embodiment, an STA that has received a trigger frame may transmit an UL MU PPDU through a channel regardless of whether the corresponding channel allocated to the STA is an idle state or a busy state. In this case, the STA may receive a trigger frame regardless of a result of CCA, and may transmit the UL MU PPDU after an SIFS.

Third Embodiment

In a third embodiment, an STA that has received a trigger frame may reflect or may not reflect a result of CCA for a channel into an UL MU PPDU (or an UL MU frame) according to a preset criterion.

For example, an STA that has received a trigger frame may determine whether or not to reflect a result of CCA for a channel into an UL MU PPDU based on the length of the UL MU PPDU, and may transmit the UL MU PPDU. The STA may determine whether the length of the UL MU PPDU to be transmitted is a specific PPDU threshold value or more. If the length of the UL MU PPDU is smaller than the PPDU threshold value, the STA may not reflect the result of the CCA and transmit the UL MU PPDU through a channel allocated thereto.

In contrast, if the length of the UL MU PPDU to be transmitted is the PPDU threshold value or more, the STA may reflect the result of the CCA for the channel allocated thereto and transmit the UL MU PPDU. Accordingly, if the channel allocated thereto is an idle state based on the results of the CCA, the STA may transmit the UL MU PPDU through the corresponding channel. If the allocated channel is a busy state, the STA may not transmit the UL MU PPDU through the corresponding channel.

In addition to the length of the UL MU PPDU, various criteria for reflecting the result of the CCA may be set. The STA that has received a trigger frame may determine whether or not to reflect the result of the CCA based on a preset criterion and transmit the UL MU PPDU.

In the present embodiment, the trigger frame may correspond to a standalone trigger frame, a trigger frame aggregated with data, multiple trigger frames, or cascaded trigger frames. Furthermore, an UL MU frame transmitted as a response to the trigger frame may correspond to a buffer status report, an NDP, or a PS-poll frame.

Fourth Embodiment

FIG. 20 is a diagram illustrating a DL/UL MU transmission method according to a fourth embodiment of the present invention.

Referring to FIG. 20, an STA that has received a trigger frame may receive the trigger frame regardless of a result of CCA (performed during a PIFS before the trigger frame is received), and may transmit an UL MU frame (or an UL MU PPDU) after a specific period (e.g., an SIFS). In this case, the STA may transmit the UL MU frame through a channel allocated thereto through the trigger frame. The reason for this is that as described above, the UL MU frame is transmitted through the same channel as a channel through which the trigger frame has been successfully received and the probability that a short management/control frame may affect other OBSSs is low because the short management/control frame has a short length. In this case, an STA that has transmitted the UL MU frame may be an STA indicating that an NAV is idle.

Fifth Embodiment

An STA that belongs to STAs that have received a trigger frame and that indicates that its NAV is idle may transmit an UL MU frame (or an UL MU PPDU) based on an energy detection value obtained by performing energy detection (or CCA) during a specific period (e.g., an SIFS) after the trigger frame is received. For example, if the energy detection value obtained for a specific channel during the SIFS after receiving the trigger frame is a specific threshold value (or CCA-ED threshold) or less (or CCA is idle), the STA may transmit the UL MU frame through the corresponding channel. In this case, the STA may transmit the UL MU frame in the specific period (e.g., an SIFS) after receiving the trigger frame.

A specific threshold value may have been previously defined, or an AP may transmit the specific threshold value to an STA using a beacon or a trigger frame (more specifically, the common information field or user-specific information field of the trigger frame).

Sixth Embodiment

An STA that belongs to STAs that have received a trigger frame and that indicates that its NAV is idle may transmit an UL MU frame based on the size (or the length) of resources allocated thereto (e.g., frequency resources, spatial streams, or a TXOP) or the size (or the length) of an UL MU frame (or an UL MU PPDU, an A-MPDU, or a TXOP) to be transmitted through the trigger frame.

For example, if the size (or the length) of the resources allocated thereto through the trigger frame or the size (or the length) of the UL MU frame to be transmitted thereto is a specific threshold value or less, the STA may receive the trigger frame and may transmit the UL MU frame after a specific period (e.g., an SIFS) regardless of a result of CCA (performed during a PIFS before the trigger frame is received). Alternatively, if the size (or the length) of the resources allocated thereto through the trigger frame or the size (or the length) of the UL MU frame to be transmitted thereto exceeds the specific threshold value, the STA may transmit the UL MU frame by reflecting a result of CCA (performed during a PIFS before the trigger frame is received) into the UL MU frame. In this case, the STA may transmit the UL MU frame through a channel that is in an idle state based on the results of the CCA.

Seventh Embodiment

The seventh embodiment may correspond to an embodiment in which the fifth and the sixth embodiments are combined. More specifically, an STA that belongs to STAs that have received a trigger frame and that indicates that its NAV is idle may transmit an UL MU frame (an UL MU data frame or a short management/control frame) based on resources allocated thereto through the trigger frame (or the UL MU frame to be transmitted) and an energy detection value obtained during a specific period.

For example, if the size (or the length) of resources allocated thereto (or an UL MU frame to be transmitted) is a first threshold value or less, an STA (i.e., an STA indicating that its NAV is idle) may receive a trigger frame and then perform energy detection (or CCA) on a channel allocated thereto during a specific period (e.g., an SIFS). If an energy detection value obtained through the energy detection is a second threshold value or less, the STA may transmit the UL MU frame through the channel allocated thereto after a specific period (e.g., an SIFS) since the trigger frame is received.

That is, the STAs may perform energy detection if the size of resources allocated thereto through a trigger frame (or an UL MU frame to be transmitted) is a first threshold value or less, and may transmit UL MU frames if an energy detection value obtained by performing the energy detection is a second threshold value or less.

In this case, the first threshold value may be determined according to various embodiments.

For example, the first threshold value may be set as a "bit value X y octet unit" (wherein y is a specific positive number) of information transmitted by an AP. For example, if the octet unit is 4 octets (y="4") and an AP transmits "0111" (i.e., a bit value="7"), an STA that has received the "0111" (i.e., the bit value="7") (i.e., an STA indicating that its NAV is idle) may transmit an UL MU frame regardless of a result of CCA (performed during a PIFS before a trigger frame is received) if the size of resources allocated thereto is 28 octets (=4*7) or less. In this case, the STA may receive the trigger frame and then transmit the UL MU frame after a specific period (e.g., an SIFS). In contrast, if the size (or the length) of the resources allocated thereto exceeds 28 octets (=4*7), the STA may transmit an UL MU frame by reflecting a result of CCA (performed during a PIFS before the trigger frame is received) into the UL MU frame.

For another example, the first threshold value may be set as duration according to a bit value transmitted by an AP. In this case, the unit of the duration may be µs, for example. For example, if an AP transmits "0111" (i.e., a bit value="7"), an STA that belongs to STAs which have received the "0111" (i.e., the bit value="7") and that indicates that its NAV is idle may transmit an UL MU frame regardless of a result of CCA (performed during a PIFS before a trigger frame is received) if duration of resources allocated thereto or duration of the UL MU frame (or an UL MU PPDU, an A-MPDU, or a TXOP) to be transmitted is 7 µs or less. In this case, the STA may receive the trigger frame and then transmit the UL MU frame after a specific period (e.g., an SIFS). In contrast, if the duration of the resources allocated thereto and the duration of the UL MU frame to be transmitted exceeds 7 µs, the STA may transmit the UL MU frame by reflecting a result of CCA (performed during a PIFS before the trigger frame is received) into the UL MU frame.

For another example, a mapping table in which a bit transmitted by an AP has been mapped to a specific threshold value may be defined. In this case, an STA may set the specific threshold value, mapped to the bit received from the AP, as a first threshold value through the defined mapping table.

For example, if "0111" has been mapped to 2000 bytes in a predetermined mapping table, an STA that has received "0111" (i.e., an STA indicating that its NAV is idle) may transmit an UL MU frame regardless of a result of CCA (performed during a PIFS before a trigger frame is received) if the size (or the length) of resources allocated thereto or the size (or the length) of an UL MU frame to be transmitted is 2000 byte or less. In this case, the STA may receive the trigger frame and then transmit the UL MU frame after a specific period (e.g., an SIFS). In contrast, if the size (or the length) of the resources allocated thereto or the size (or the length) of the UL MU frame to be transmitted exceeds 2000 bytes, the STA may transmit the UL MU frame by reflecting a result of CCA (performed during a PIFS before the trigger frame is received) into the UL MU frame.

For another example, a specific bit sequence may be defined as a specific threshold value. An AP may notify an STA of a first threshold value by transmitting the specific bit sequence. For example, if "0111" has been previously defined as 3 µs, an STA that has received "0111" transmitted by an AP (i.e., an STA indicating that its NAV is idle) may transmit an UL MU frame regardless of a result of CCA (performed during a PIFS before a trigger frame is received) if duration of resources allocated thereto or duration of the UL MU frame to be transmitted is 3 µs or less. In this case, the STA may receive the trigger frame and then transmit the UL MU frame after a specific period (e.g., an SIFS). In contrast, if the duration of the resources allocated thereto or the duration of the UL MU frame to be transmitted exceeds 3 µs, the STA may transmit the UL MU frame by reflecting a result of CCA (performed during a PIFS before the trigger frame is received) into the UL MU frame.

In the aforementioned examples, the transmission of an UL MU frame by reflecting (or considering) a result of CCA may include that each STA transmits an UL MU frame through a channel allocated thereto if the channel is an idle state by considering a result of CCA for the channel and that each STA does not transmit an UL MU frame through a corresponding channel if the corresponding channel is a busy state.

Information about the first threshold value may be transmitted to each STA through a beacon or management frame for CCA or dynamic CCA setting. Alternatively, information about the first threshold value may be transmitted to each STA through a beacon or a trigger frame (more specifically, the common information field or user-specific information field of the trigger frame). Alternatively, information about the first threshold value may be transmitted to each STA using the HE-SIG (i.e., the HE-SIG A or HE-SIG B) field of a trigger frame, an MAC header, or the reserved bits of a service field within a data field.

The second threshold value may have been previously defined. Alternatively, an AP may transmit information about the second threshold value to each STA using the HE-SIG (i.e., the HE-SIG A or HE-SIG B) field of a trigger frame, an MAC header, or the reserved bits of a service field within a data field.

Eighth Embodiment

An STA that belongs to STAs which have received a trigger frame and that indicates that its NAV is idle may transmit an UL MU frame regardless of a result of CCA (performed during a PIFS before the trigger frame is received) if the ACK policy of the UL MU frame (or an UL MU PPDU) to be transmitted is no ACK or delayed BA. In this case, STAs may receive the trigger frame and then transmit UL MU frames after a specific period (e.g., an SIFS).

For example, in the case of an NDP or ACK/BA frame of a short control frame, an AP does not need to separately transmit ACK indicating that the NDP or ACK/BA frame has been normally received. Accordingly, an STA may transmit an UL MU frame regardless of a result of CCA if it performs UL MU transmission on the NDP or ACK/BA frame.

Ninth Embodiment

The ninth embodiment may correspond to an embodiment in which the fifth and the eighth embodiments have been combined. More specifically, an STA that belongs to STAs which have received a trigger frame and that indicates that its NAV is idle may transmit an UL MU frame based on an energy detection value (or a CCA level) obtained during a specific period (e.g., an SIFS) after the trigger frame is received if the ACK policy of the UL MU frame (or an UL MU PPDU) to be transmitted is no ACK or delayed BA.

For example, an STA may transmit an UL MU frame through a channel allocated thereto if an energy detection value for the channel is a specific threshold value or less. In this case, the STA may receive a trigger frame and then transmit the UL MU frame after a specific period (e.g., an SIFS). The specific threshold value may have been previously defined, or an AP may transmit the specific threshold value to an STA using a beacon or the trigger frame (more specifically, the common information field or user-specific information field of the trigger frame).

In the case of an NDP or ACK/BA frame of a short control frame, an AP does not need to separately transmit ACK indicating that the NDP or ACK/BA frame has been normally received. Accordingly, if an STA performs UL MU transmission on an NDP or ACK/BA frame, it may receive a trigger frame and then transmit an UL MU frame if an energy detection value obtained by performing energy detection during a specific period is a specific threshold value or less.

Tenth Embodiment

If an STA that has received a trigger frame (i.e., an STA indicating that its NAV is idles) transmits only an UL MU data frame, each STA may perform CCA during a specific period (e.g., an PIFS or an SIFS) before the trigger frame is received or during a specific period (e.g., an SIFS) after the trigger frame is received, and may transmit an UL MU frame through a channel of an idle state based on the results of the CCA.

Alternatively, an STA that has received a trigger frame and a DL MU PPDU may transmit ACK for the DL MU PPDU through the one UL MU PPDU by pigging back the ACK to UL MU data. In this case, the STA may receive the DL MU PPDU and then transmit the UL MU PPDU after a specific period (e.g., an SIFS). In this case, in the manner similar to that described above, each STA may perform CCA during a specific period (e.g., an PIFS or an SIFS) before the trigger frame is received or during a specific period (e.g., an SIFS) after the trigger frame is received, and may transmit a corresponding UL MU frame through a channel of an idle state based on the results of the CCA. Alternatively, each STA may transmit the corresponding UL MU PPDU regardless of the results of the CCA. Accordingly, each STA may receive the trigger frame regardless of the result of the CCA and transmit the corresponding UL MU frame after a specific period (e.g., an SIFS).

Eleventh Embodiment

FIG. 21 is a diagram illustrating an UL MU transmission method according to an eleventh embodiment of the present invention.

Referring to FIG. 21, in the present embodiment, unlike in the previous embodiments, an AP may directly instruct an STA whether or not to reflect a result of carrier sensing through a trigger frame. In this case, as described above, the carrier sensing is a concept generally covering both a physical carrier sense mechanism and a virtual carrier sense mechanism. Whether an NAV indicates an idle state (i.e., an NAV state) may be determined by the virtual carrier sense mechanism (or the results of virtual carrier sensing), and whether CCA is idle (i.e., a result of CCA) may be determined by the physical carrier sense mechanism (or the results of physical carrier sensing). That is, in the present embodiment, an AP may directly instruct each STA whether the STA will reflect the results of physical carrier and virtual carrier sensing (or a result of CCA and an NAV state) when performing UL MU frame transmission through a trigger frame.

In this case, the AP may include a carrier sense (CS) indicator (or a CS-request indicator), indicating whether or not to reflect a result of carrier sensing, in the trigger frame and transmit the trigger frame to each STA. For example, the AP may include the CS indicator, indicating whether a result of carrier sensing will be reflected (or whether a result of CCA and an NAV state will be reflected), in the HE-SIG field (i.e., the HE-SIG A, B, or C field), MAC header, or common information (Common Info) field of the trigger frame or a user-specific (Per User Info 1~N) field, and may transmit the trigger frame to each STA.

In this case, the CS indicator may have a z bit size. In this case, z may be a specific positive number. For example, the CS indicator of a 1 bit size indicating whether or not to reflect a result of carrier sensing may be included in the common information field or user-specific information field of the trigger frame and then transmitted.

In this case, if an AP sets the CS indicator to "1" (or "0") and transmits the CS indicator (i.e., if the CS indicator does not indicate the reflection of a result of CCA and/or an NAV state (or if the CS indicator is "off")), an STA that has received a corresponding trigger frame may transmit an UL MU frame (or an UL MU PPDU) (refer to FIG. 21($a$)) regardless of the NAV state and/or a result of CCA. More specifically, the STA that has received the corresponding trigger frame i) may transmit the UL MU frame (i.e., only the NAV state is reflected) regardless of a result of CCA if an NAV indicates an idle state, ii) may transmit the UL MU frame (i.e., only a result of CCA are reflected) regardless of the NAV state if CCA is idle, and iii) may transmit the UL MU frame (both the NAV state and the result of CCA are not reflected) regardless of the NAV state and the result of CCA. In this case, the STA may receive the trigger frame and then transmit the corresponding UL MU frame after a specific period (e.g., an SIFS).

Alternatively, if an AP sets the CS indicator to "0" (or "1") and transmits the CS indicator (i.e., if the CS indicator indicates the reflection of a result of CCA and an NAV state (if the CS indicator is "on")), an STA that has received a corresponding trigger frame may reflect a result of carrier sensing and may transmit an UL MU frame (or an UL MU PPDU) through a channel (e.g., a secondary channel) of an idle state (i.e., if a specific channel is an idle state in the case of dynamic allocation and if all of channels are an idle state in the case of static allocation). More specifically, the STA that has received the corresponding trigger frame may transmit the UL MU frame through the corresponding channel (refer to FIG. 21($b$)) if an NAV indicates an idle state and CCA is idle as a result of carrier sensing for a channel.

If a CS indicator is included in the common information field, the common information field may include one CS indicator that is common to STAs receiving a trigger frame or may include all of CS indicators for respective STAs. If a CS indicator is included in the user-specific information field of the trigger frame, a CS indicator for each STA may be indicated in the user-specific information field for each STA. For example, a first user-specific information field for an STA 1 may include a CS indicator for the STA 1, and a CS indicator for an STA 2 may be included in a second user-specific information field for the STA 2.

Furthermore, in the manner similar to that described above, an AP may directly instruct an STA whether or not to perform carrier sensing through a trigger frame. Accordingly, the AP may include a CS execution indicator, instructing each STA whether or not to perform carrier sensing before transmitting an UL MU frame, in a trigger frame and transmit the trigger frame. In this case, the CS execution indicator may have a z bit size. The CS execution indicator may be included in the HE-SIG field (i.e., the HE-SIG A, B, or C field), MAC header, or common information field of the trigger frame or a user-specific (Per User Info 1~N) field and then transmitted. If the received CS execution indicator indicates carrier sensing, the STA may perform carrier sensing before transmitting an UL MU frame and then transmit the UL MU frame if a channel is idle. In contrast, if the received CS execution indicator does not indicate carrier sensing, the STA may transmit an UL MU frame without performing carrier sensing before transmitting the UL MU frame.

In this case, the STA may not redundantly perform the same carrier sensing for a channel within the same TXOP.

FIG. 22 is a diagram illustrating an UL MU transmission method in which carrier sensing is not redundantly performed.

Referring to FIG. 22, it may be assumed that an STA 2 performs carrier sensing on a specific channel within the same TXOP and then transmits a first UL MU frame through a corresponding channel. In this case, the STA 2 may not redundantly perform carrier sensing before transmitting a second UL MU frame through the same channel. The reason for this is that redundant carrier sensing for the same channel is unnecessary because the STA 2 has successfully transmitted the first UL MU frame through the channel that is idle as a result of the execution of carrier sensing in a previous step.

As described above with reference to FIG. 18, if DL/UL MU PPDUs are transmitted using a cascaded method within one TXOP, the interval between the DL MU PPDU and the UL MU PPDU may be defined as an SIFS. In this case, for a response to a trigger frame transmitted in the DL MU PPDU that is not the first within the TXOP, it is difficult to check CCA during a PIFS as in the existing RTS/CTS frame procedure and to apply a method for transmitting the UL MU PPDU without any change. The reason for this is that the time (i.e., an SIFS) between the DL MU PPDU and the UL MU PPDU is shorter than the time (i.e., a PIFS) taken to check CCA in an RTS/CTS frame procedure (i.e., the PIFS>the SIFS). Accordingly, in this case, a CCA procedure may be newly defined. A response procedure after trigger frame transmission may be associated with "information indicating that a corresponding PPDU is a cascaded structure" included in a trigger frame.

FIG. 23 is a diagram regarding a method for performing CCA according to an embodiment of the present invention.

Referring to FIG. 23(a), if DL/UL MU PPDUs are transmitted using a cascaded method, an STA that belongs to STAs which have received a trigger frame triggering the transmission of an UL MU frame and that indicates that is NAV is idle may perform energy detection (or CCA) during a specific period (e.g., an SIFS) before receiving the trigger frame transmitted through the DL MU PPDU (transmitted after the first or the second within the same TXOP). If an energy detection value is a specific threshold value or less (if CCA is idle), the STA may receive the trigger frame and then transmit an UL MU frame after a specific period (e.g., an SIFS).

Referring to FIG. 23(b), if DL/UL MU PPDUs are transmitted using a cascaded method, an STA that belongs to STAs which have received a trigger frame triggering the transmission of an UL MU frame and that indicates that is NAV is idle may perform energy detection (or CCA) during a specific period (e.g., an SIFS) after receiving the trigger frame transmitted through the DL MU PPDU (transmitted after the first or the second within the same TXOP). If an energy detection value is a specific threshold value or less (if CCA is idle), the STA may receive the trigger frame and then transmit an UL MU frame after a specific period (e.g., an SIFS).

In this case, a specific threshold value may have been previously defined, or an AP may transmit the specific threshold value to the STA through a beacon or a trigger frame (more specifically, the common information field or user-specific information field of the trigger frame).

Alternatively, unlike in the aforementioned embodiments, the STA may receive the trigger frame regardless of a result of CCA and then transmit the UL MU frame after a specific period (e.g., an SIFS).

If a plurality of trigger frames is transmitted within one TXOP, an AP may not need to perform EDCA, etc. as in the existing in order to transmit a trigger frame. In this case, a specific interval (e.g., an SIFS) may be set between a frame transmitted by an AP or an STA and the trigger frame transmitted by the AP. In this case, the aforementioned method for transmitting DL/UL MU PPDU using a cascaded method may be likewise applied.

In addition to the aforementioned embodiment, a different trigger response procedure may be applied depending on the type of a frame (or content) in which an STA that has received a trigger frame performs UL MU transmission.

Method for Reflecting a Result of CCA

A method of reflecting a result of CCA using what method may have been previously set depending on the format of a trigger frame received by an STA. For example, an STA may determine that a result of CCA will be reflected using what method and determine whether or not to transmit an UL MU frame depending on whether a received trigger frame is a standalone trigger frame, a trigger frame aggregated with data, multiple trigger frames, or a cascaded trigger frame.

More specifically, for example, a method for reflecting a result of CCA may be determined depending on whether a trigger frame is aggregated with data and transmitted. For example, if a trigger frame is not aggregated with data and transmitted, the trigger frame may have been previously configured so that a result of CCA performed during a "PIFS" before the trigger frame is received is reflected into the trigger frame and an UL MU frame is transmitted if a channel is an idle state. Furthermore, if a trigger frame is aggregated with data and transmitted, the trigger frame may have been previously configured so that a result of CCA performed during an "SIFS" after the trigger frame is received is reflected into the trigger frame and an UL MU frame is transmitted if a channel is an idle state.

Alternatively, if a trigger frame is aggregated with data and transmitted, the trigger frame may have been previously configured so that both a result of CCA performed during an PIFS before the trigger frame is received and a result of CCA performed during an SIFS after the trigger frame is received may be reflected into the trigger frame and an UL MU frame is transmitted. In this case, an STA transmits the UL MU frame if a channel is an idle state as a result of CCA performing during the PIFS and the SIFS.

For another example, a method for reflecting a result of CCA may be determined depending on whether a trigger frame is a standalone trigger frame or a cascaded trigger frame.

For example, if a trigger frame is a standalone trigger frame, the trigger frame may have been previously configured so that a result of CCA performed during a "PIFS"

before the trigger frame is received is reflected into the trigger frame and an UL MU frame is transmitted if a channel is an idle state. Furthermore, if a trigger frame is a cascaded trigger frame, the trigger frame may have been previously configured so that a result of CCA performed during an "SIFS" after the trigger frame is received is reflected into the trigger frame and an UL MU frame is transmitted if a channel is an idle state.

Alternatively, a standalone trigger frame may have been previously configured so that a result of CCA performed during a "PIFS" before the trigger frame is received is reflected and an UL MU frame is transmitted if a channel is an idle state. Furthermore, a cascaded trigger frame may have been previously configured so that a result of CCA is not reflected (i.e., regardless of whether a channel is an idle state) and an UL MU frame is transmitted during a specific period (e.g., an SIFS) after the trigger frame is received. Alternatively, a cascaded trigger frame may have been previously configured so that an UL MU frame is transmitted if a channel is an idle state as a result of CCA performed during a specific period (e.g., an PIFS) before a trigger frame is transmitted in the case of the trigger frame that is first transmitted within one TXOP. Furthermore, a trigger frame (or a DL MU frame, an UL MU frame, a DL MU PPDU, or an UL MU PPDU) transmitted after the second may be transmitted without reflecting a result of CCA.

In addition to the aforementioned embodiments, a method for reflecting a result of CCA depending on the format of an UL MU trigger frame transmitted as a response to the trigger frame may have been previously configured.

Method for Indicating CCA Execution Position

An AP may directly indicate the position (or time) in which CCA (or energy detection) of an STA has been executed through a trigger frame or a beacon frame or the like. That is, the AP may directly indicate whether the STA will perform CCA (or energy detection) during a specific period (e.g., a PIFS or an SIFS) "before" a trigger frame is received or perform CCA (or energy detection) during a specific period (e.g., an SIFS) "after" the trigger frame is received in order to transmit an UL MU frame. As a result, if a result of the CCA in the position (or time) indicated by the AP is idle (or if an energy detection value is a specific threshold value or less), the STA may receive the trigger frame and then transmit the UL MU frame after the specific period (e.g., the SIFS).

In this case, the AP may transmit an indicator, indicating the time when the CCA is executed, to the STA through the trigger frame. The corresponding information may be included in the common information field or user-specific information field of the trigger frame and then transmitted.

For example, the AP may indicate a CCA execution position to be reflected by the STA using the indicator of a 1 bit size. If the AP sets the indicator to "1" and transmits the indicator to the STA, the STA may perform CCA (or energy detection) during a specific period (e.g., a PIFS or an SIFS) before the trigger frame is received. If the CCA is idle (or if an energy detection value is a specific threshold or less) as a result of the execution of the CCA, the STA may receive the trigger frame and then transmit the UL MU frame after a specific period (e.g., an SIFS). Alternatively, if the AP sets the indicator to "0" and transmits the indicator to the STA, the STA may perform CCA (or energy detection) during a specific period (e.g., an SIFS) after the trigger frame is received. If the CCA is idle (or if an energy detection value is a specific threshold or less) as a result of the execution of the CCA, the STA may receive the trigger frame and then transmit the UL MU frame after a specific period (e.g., an SIFS).

In this case, the AP may further transmit the CCA indicator, described in the eleventh embodiment, to the STA along with the indicator indicating the time when CCA is executed.

In the manner similar to that described above, the AP may indicate a CCA execution position (or time) to be reflected before the STA transmits the UL MU frame. That is, the AP may directly indicate whether the STA will reflect CCA (or energy detection) performed during a specific period (e.g., a PIFS or an SIFS) "before" the trigger frame is received or whether the STA will reflect CCA (or energy detection) during a specific period (e.g., an SIFS) "after" the trigger frame is received. As a result, if CCA in the position (or time) indicated by the AP is idle (or if an energy detection value is a specific threshold value or less), the STA may receive the trigger frame and then transmit the UL MU frame after the specific period (e.g., the SIFS).

Interval Between Trigger Frame and UL MU Frame

An AP may define the interval between periods in which a trigger frame and an UL MU frame are transmitted as specific values, and may directly indicate which one of the specific values will be used through the trigger frame. An STA that has received such an indication may transmit the UL MU frame after the indicated interval since the trigger frame is received. For example, the AP may indicate one of an SIFS and a newly defined SSIFS (=D1 (aRxPHYDelay)+ M1 (aMACProcessingDelay)+CCADel (aCCATime−D1)+ RX/TX (aRxTxTurnaroundTime)) value as the interval between the periods in which the trigger frame and the UL MU frame are transmitted.

If only a standalone trigger frame is transmitted, the AP may transmit an indicator, instructing the STA that it receives the trigger frame and then transmits the UL MU frame after the SIFS, to the STA through the trigger frame. After receiving the indicator, the STA may receive the trigger frame and then transmit the UL MU frame after the SIFS. Furthermore, if a cascaded trigger frame is transmitted, the AP may transmit an indicator, instructing the STA that it receives the trigger frame and then transmits the UL MU frame after the SSIFS, to the STA through the trigger frame. After receiving the indicator, the STA may receive the trigger frame and then transmit the UL MU frame after the SSIFS.

The AP may randomly set such an indicator and transmit the indicator or may set a period for the indicator and transmit the indicator.

The STA may apply a predefined interval depending on the format of the received trigger frame. For example, if a standalone trigger frame is received, the STA may set the interval between the trigger frame and the UL MU frame as the SIFS. In other cases (e.g., if a cascaded trigger frame is received), the STA may set the interval between the trigger frame and the UL MU frame as the SSIFS.

In the aforementioned embodiments, the interval between the transmission of the trigger frame and the transmission of the UL MU frame and whether or not to reflect a result of CCA may be independently operated.

Method for Transmitting UL MU Frame

If, as a result of CCA, a specific channel of resources (or channels) allocated through a trigger frame is an idle state and the remaining channels are an busy state, an STA may transmit an UL MU frame through a specific channel that belongs to the resources allocated by an AP and that is an idle state. That is, the STA may transmit the UL MU frame using an idle resource having a size equal to or smaller than the size of the allocated resources. For example, if a 20 MHz channel of a 40 MHz channel allocated to the STA is an idle state and the remaining 20 MHz channel is a busy state, the STA may transmit the UL MU frame using the 20 MHz channel that is the idle state.

In this case, the STA may include information about the channel through which the UL MU frame has been transmitted in the HE-SIG A, HE-SIG B or HE-SIG C of the UL MU frame in a bitmap form, and transmit the UL MU frame. The AP that has received the UL MU frame can be aware that the STA has transmitted the UL MU frame using which channel and can thus receive the UL MU frame transmitted by the STA.

FIG. 24 is a flowchart illustrating a data transmission method of an STA according to an embodiment of the present invention. The aforementioned embodiments may be likewise applied in relation to the flowchart of FIG. 24. Accordingly, a redundant description is omitted hereinafter.

Referring to FIG. 24, an STA may perform carrier sensing at step S2401. More specifically, the STA may perform carrier sensing during a PIFS before it receives a trigger frame from an AP.

Next, the STA may receive the trigger frame at step S2402. In this case, the trigger frame may include information for UL MU transmission and a carrier sense indicator indicating whether or not to reflect a result of the carrier sensing. Furthermore, the trigger frame may be a standalone trigger frame, a trigger frame aggregated with data, multiple trigger frame, or a cascaded trigger frame.

Next, the STA may transmit an UL MU frame at step S2403. More specifically, the STA may transmit an UL MU frame based on information for UL MU transmission which has been included in the received trigger frame. In this case, if the carrier sense indicator included in the trigger frame indicates the reflection of a result of carrier sensing, the STA may transmit the UL MU frame through a channel based on a result of the carrier sensing performed at step S2401. Alternatively, if the carrier sense indicator does not indicate the reflection of a result of the carrier sensing, the STA may transmit the UL MU frame through the channel regardless of a result of the carrier sensing performed at step S2401.

Furthermore, step S2401 may be performed after step S2402. Accordingly, the STA may perform carrier sensing during a specific period (e.g., an SIFS) after receiving the trigger frame. Thereafter, an operation performed at step S2303 is the same as that described above.

FIG. 25 is a block diagram of each STA apparatus according to an embodiment of the present invention.

Referring to FIG. 25, the STA apparatus 2510 may include memory 2512, a processor 2511, and a radio frequency (RF) unit 2513. Furthermore, as described above, the STA is an HE STA apparatus and may be an AP or a non-AP STA.

The RF unit 2513 is connected to the processor 2511, and may transmit/receive radio signals. The RF unit 2513 may up-convert data received from the processor 2511 in a transmission/reception band, and may transmit a signal.

The processor 2511 is connected to the RF unit 2513 and implements the physical layer and/or the MAC layer according to an IEEE 802.11 system. The processor 2511 may be configured to perform operations according to various embodiments of the present invention based on the drawings and description. Furthermore, a module for implementing the operations of the STA apparatus 2510 according to the various embodiments of the present invention may be stored in the memory 2512 and executed by the processor 2511.

The memory 2512 is connected to the processor 2511 and stores various pieces of information for driving the processor 2511. The memory 2512 may be included within the processor 2511 or installed outside the processor 2511 and may be connected to the processor 2511 by known means.

Furthermore, the STA apparatus 2510 may include a single antenna or multiple antennas.

A detailed configuration of the STA apparatus 2510 of FIG. 25 may be implemented by independently applying the items described in the various embodiments of the present invention or applying two or more of the various embodiments at the same time.

Although the drawings have been divided and described for convenience of description, embodiments described with reference to the drawings may be merged to implement a new embodiment. Furthermore, the configurations and methods of the aforementioned embodiments are not limited and applied to the apparatus as described above, and the embodiments may be constructed by selectively combining some of or the entire embodiments so that they are modified in various ways.

Furthermore, although some embodiments have been illustrated and described above, this specification is not limited to the aforementioned specific embodiments, and a person having ordinary skill in the art to which this specification pertains may modify the present invention in various ways without departing from the gist of the claims. Such modified embodiments should not be individually interpreted from the technical spirit or prospect of this specification.

Various embodiments have been described in an exemplary form for implementing the present invention.

INDUSTRIAL APPLICABILITY

Although the data transmission/reception methods in wireless communication systems according to the embodiments of the present invention have been described based on an example in which the methods are applied to the IEEE 802.11 systems, they may also be applied to various wireless communication systems in addition to the IEEE 802.11 systems.

What is claimed is:

1. A method for performing, by a station (STA) apparatus, uplink (UL) multi-user (MU) transmission in a wireless communication system, the method comprising:
receiving a trigger frame comprising information for the UL MU transmission and an indicator indicating whether or not to execute carrier sensing,
wherein the method further comprises:
if the indicator indicates executing the carrier sensing, executing the carrier sensing on a specific channel, considering a result of the carrier sensing, and transmitting a UL MU frame in response to the trigger frame; and
if the indicator indicates not executing the carrier sensing, transmitting the UL MU frame in response to the trigger frame without the carrier sensing,
wherein considering the result of the carrier sensing comprises:
if the specific channel is considered idle as a result of considering both a channel clear assessment (CCA) and a network allocation vector (NAV), transmitting the UL MU frame through the specific channel; and
if the specific channel is considered busy as the result of considering both the CCA and the NAV, not transmitting the UL MU frame through the specific channel, wherein the NAV indicates idle when a NAV count value is nonzero and a non-bandwidth signaling transmitter address (TA) field is same as an address of a transmission opportunity (TXOP) holder, and wherein the CCA indicates busy when a detected energy level through energy detection exceeds a threshold.

2. The method of claim 1, wherein executing the carrier sensing comprises performing energy detection to check the CCA, during a short interframe space (SIFS) after receiving the trigger frame.

3. The method of claim 1, wherein the specific channel corresponds to a channel allocated to the STA apparatus.

4. The method of claim 1, wherein the specific channel is considered idle when both the CCA and the NAV indicate idle, and wherein the specific channel is considered busy when at least one of the CCA or the NAV indicates busy.

5. The method of claim 4, wherein the NAV indicates idle when the NAV count value is zero.

6. The method of claim 4, wherein the CCA indicates idle when the detected energy level through the energy detection does not exceed the threshold.

7. The method of claim 1, further comprising:

if an Access Point (AP) transmitting the trigger frame is a transmission opportunity (TXOP) holder setting the NAV of the STA apparatus, transmitting the UL MU frame without considering the NAV.

8. The method of claim 1, wherein the trigger frame includes a common information field for all of STA apparatuses receiving the trigger frame and a user-specific information field for an individual STA apparatus of the STA apparatuses, wherein the user-specific information field is included in the trigger frame as often as a number of the STA apparatuses, wherein the common information field includes the indicator and the user-specific information field includes an allocated frequency resource for the individual STA apparatus, and wherein whether the carrier sensing is executed is determined commonly among the STA apparatuses based on the indicator and the specific channel on which the carrier sensing is executed of the individual STA apparatus corresponds to the allocated frequency resource for the individual STA apparatus.

9. A station (STA) apparatus performing uplink (UL) multi-user (MU) transmission in a wireless communication system, the STA apparatus comprising:

a radio frequency (RF) unit configured to transmit/receive radio signals; and a processor configured to control the RF unit, wherein the processor is configured to:

receive a trigger frame comprising information for the UL MU transmission and an indicator indicating whether or not to execute carrier sensing, wherein the processor is further configured to:

if the indicator indicates executing the carrier sensing, execute the carrier sensing on a specific channel, consider a result of the carrier sensing, and transmit a UL MU frame in response to the trigger frame; and if the indicator indicates not executing the carrier sensing, transmit the UL MU frame in response to the trigger frame without the carrier sensing, wherein, when considering the result of the carrier sensing, the processor is further configured to:

if the specific channel is considered idle as a result of considering both a channel clear assessment (CCA) and a network allocation vector (NAV), transmit the UL MU frame through the specific channel; and if the specific channel is considered busy as the result of considering both the CCA and the NAV, not transmit the UL MU frame through the specific channel, wherein the NAV indicates idle when a NAV count value is nonzero and a non-bandwidth signaling transmitter address (TA) field is same as an address of a transmission opportunity (TXOP) holder, and wherein the CCA indicates busy when a detected energy level through energy detection exceeds a threshold.

10. The STA apparatus of claim 9, wherein the processor is further configured to perform energy detection to check the CCA, during a short interframe space (SIFS) after receiving the trigger frame.

11. The STA apparatus of claim 9, wherein the specific channel is considered idle when both the CCA and the NAV indicate idle, and wherein the specific channel is considered busy when at least one of the CCA or the NAV indicates busy.

12. The STA apparatus of claim 11, wherein the NAV indicates idle when the NAV count value is zero.

13. The STA apparatus of claim 11, wherein the CCA indicates idle when the detected energy level through the energy detection does not exceed the threshold.

14. The STA apparatus of claim 9, wherein the specific channel corresponds to a channel allocated to the STA apparatus.

15. The STA apparatus of claim 9, wherein the processor is further configured to:

if an Access Point (AP) transmitting the trigger frame is a transmission opportunity (TXOP) holder setting the NAV of the STA apparatus, transmit the UL MU frame without considering the NAV.

16. The STA apparatus of claim 9, wherein the trigger frame includes a common information field for all of STA apparatuses receiving the trigger frame and a user-specific information field for an individual STA apparatus of the STA apparatuses, wherein the user-specific information field is included in the trigger frame as often as a number of the STA apparatuses, wherein the common information field includes the indicator and the user-specific information field includes an allocated frequency resource for the individual STA apparatus, and wherein whether the carrier sensing is executed is determined commonly among the STA apparatuses based on the indicator and the specific channel on which the carrier sensing is executed of the individual STA apparatus corresponds to the allocated frequency resource for the individual STA apparatus.

* * * * *